(12) United States Patent
Matsuyama et al.

(10) Patent No.: US 10,846,457 B2
(45) Date of Patent: *Nov. 24, 2020

(54) LITHOGRAPHY SYSTEM, SIMULATION APPARATUS, AND PATTERN FORMING METHOD

(71) Applicant: NIKON CORPORATION, Tokyo (JP)

(72) Inventors: Tomoyuki Matsuyama, Kuki (JP); Shintaro Kudo, Ageo (JP); Hirotaka Kohno, Saitama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,221

(22) Filed: Jun. 4, 2019

(65) Prior Publication Data

US 2019/0302622 A1    Oct. 3, 2019

Related U.S. Application Data

(63) Continuation of application No. 15/315,073, filed as application No. PCT/JP2015/065828 on Jun. 1, 2015, now Pat. No. 10,338,480.

(30) Foreign Application Priority Data

May 30, 2014    (JP) .................................. 2014-112235

(51) Int. Cl.
*G06F 17/50*    (2006.01)
*G03F 7/00*    (2006.01)
(Continued)

(52) U.S. Cl.
CPC ............ *G06F 30/398* (2020.01); *G03F 7/705* (2013.01); *G03F 7/70125* (2013.01);
(Continued)

(58) Field of Classification Search
None
See application file for complete search history.

(56) References Cited

U.S. PATENT DOCUMENTS

| 6,771,350 B2 | 8/2004 | Nishinaga |
| 6,927,836 B2 | 8/2005 | Nishinaga |
| 7,245,356 B2 | 7/2007 | Hansen |
| 7,817,249 B2 | 10/2010 | Uehara |
| 8,351,037 B2 | 1/2013 | Azpiroz et al. |

(Continued)

FOREIGN PATENT DOCUMENTS

| JP | 2003-197504 A | 7/2003 |
| JP | 2006-024763 A | 1/2006 |
| WO | 2011/102109 A1 | 8/2011 |

OTHER PUBLICATIONS

M. van de Kerkhof et al., "Imaging performance optimization for hyper-NA scanner systems in high volume production," Optical Microlithography XXI, Proc. of SPIE vol. 6924, (2008), 14 pages. (Year: 2008).*

(Continued)

*Primary Examiner* — Leigh M Garbowski
(74) *Attorney, Agent, or Firm* — Oliff PLC

(57) ABSTRACT

A simulation apparatus has: a first processing part configured to obtain a value of a parameter in a first set relating to the forming of the pattern; a second processing part configured to obtain a value of a parameter in a second set that is at least partially same as the parameter in the first set and relating to the forming of the pattern; and an integration processing part configured to evaluate, based on the value of the parameter in the first set and the value of the parameter in the second set, a state of the pattern formed on the substrate and a forming condition when the pattern is formed, and to determine based on the result of the evaluation whether or not to make at least one of the first processing part and the second processing part recalculate the value of the parameter in the corresponding set.

48 Claims, 9 Drawing Sheets

(51) Int. Cl.
*G06F 30/398* (2020.01)
*G03F 7/20* (2006.01)
*G03F 1/82* (2012.01)
*G03F 1/36* (2012.01)
*G03F 1/70* (2012.01)
*G06F 30/39* (2020.01)
*G06F 119/18* (2020.01)
*G06F 30/337* (2020.01)

(52) U.S. Cl.
CPC ...... *G03F 7/70441* (2013.01); *G03F 7/70483* (2013.01); *G03F 7/70491* (2013.01); *G03F 7/70616* (2013.01); *G03F 7/70625* (2013.01); *G03F 7/70633* (2013.01); *G03F 1/36* (2013.01); *G03F 1/70* (2013.01); *G03F 1/82* (2013.01); *G06F 30/337* (2020.01); *G06F 30/39* (2020.01); *G06F 2119/18* (2020.01)

(56) References Cited

U.S. PATENT DOCUMENTS

| | | |
|---|---|---|
| 8,745,551 B2 | 6/2014 | Feng et al. |
| 8,839,169 B2 | 9/2014 | Gyoda et al. |
| 8,893,058 B2 | 11/2014 | Cao et al. |
| 8,958,059 B2 | 2/2015 | Mikami |
| 9,311,700 B2 | 4/2016 | Daneshpanah et al. |
| 9,378,309 B2 | 6/2016 | Feng et al. |
| 9,551,926 B2 | 1/2017 | Gyoda et al. |
| 9,551,938 B2 | 1/2017 | Matsuyama et al. |
| 10,338,480 B2 * | 7/2019 | Matsuyama ........ G03F 7/70483 |
| 2012/0133915 A1 | 5/2012 | Matsuyama et al. |
| 2012/0185215 A1 | 7/2012 | Hakko |

OTHER PUBLICATIONS

Feb. 15, 2019 Notice of Allowance issued in U.S. Appl. No. 15/315,073.

* cited by examiner

[FIG. 7]
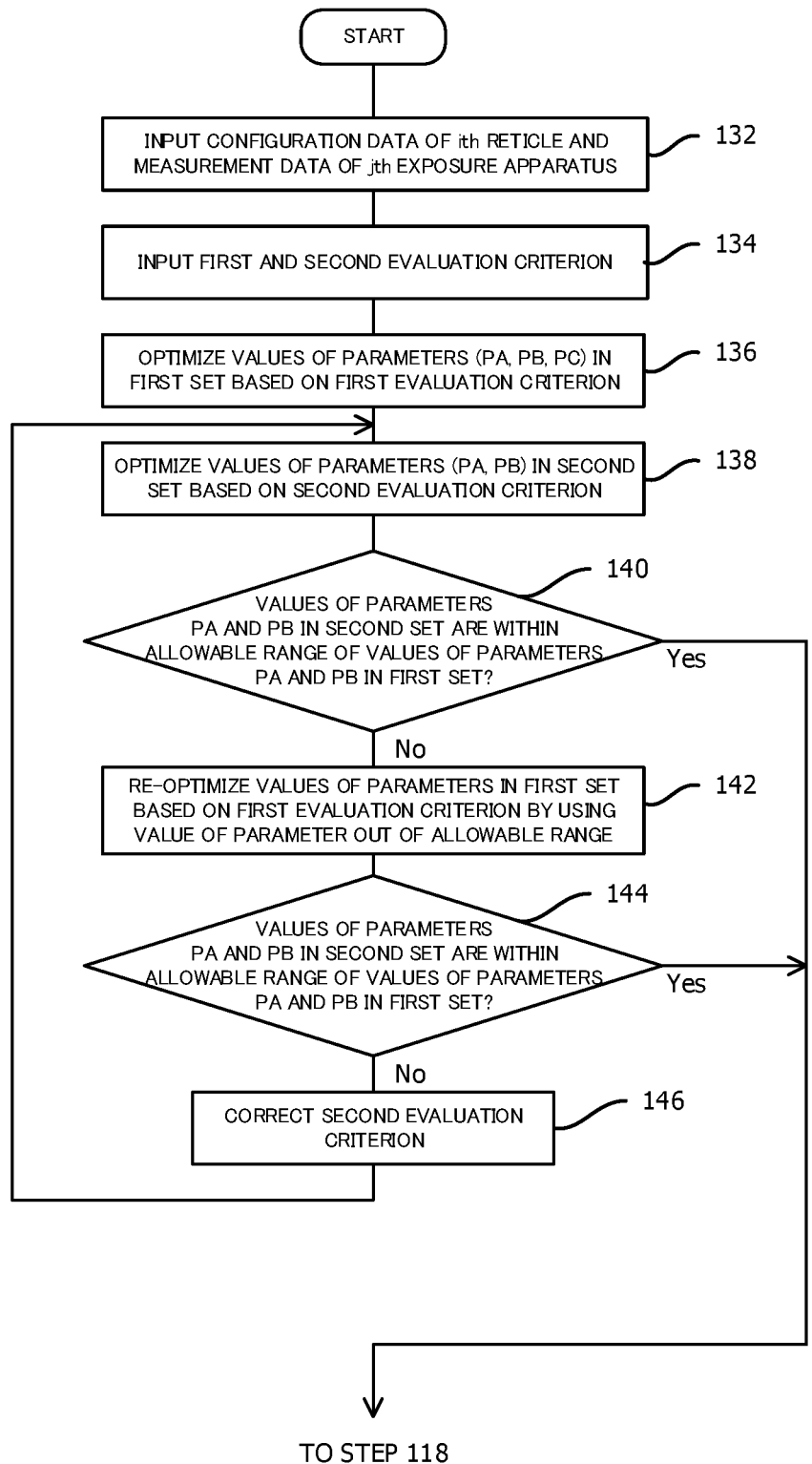

[FIG. 8]
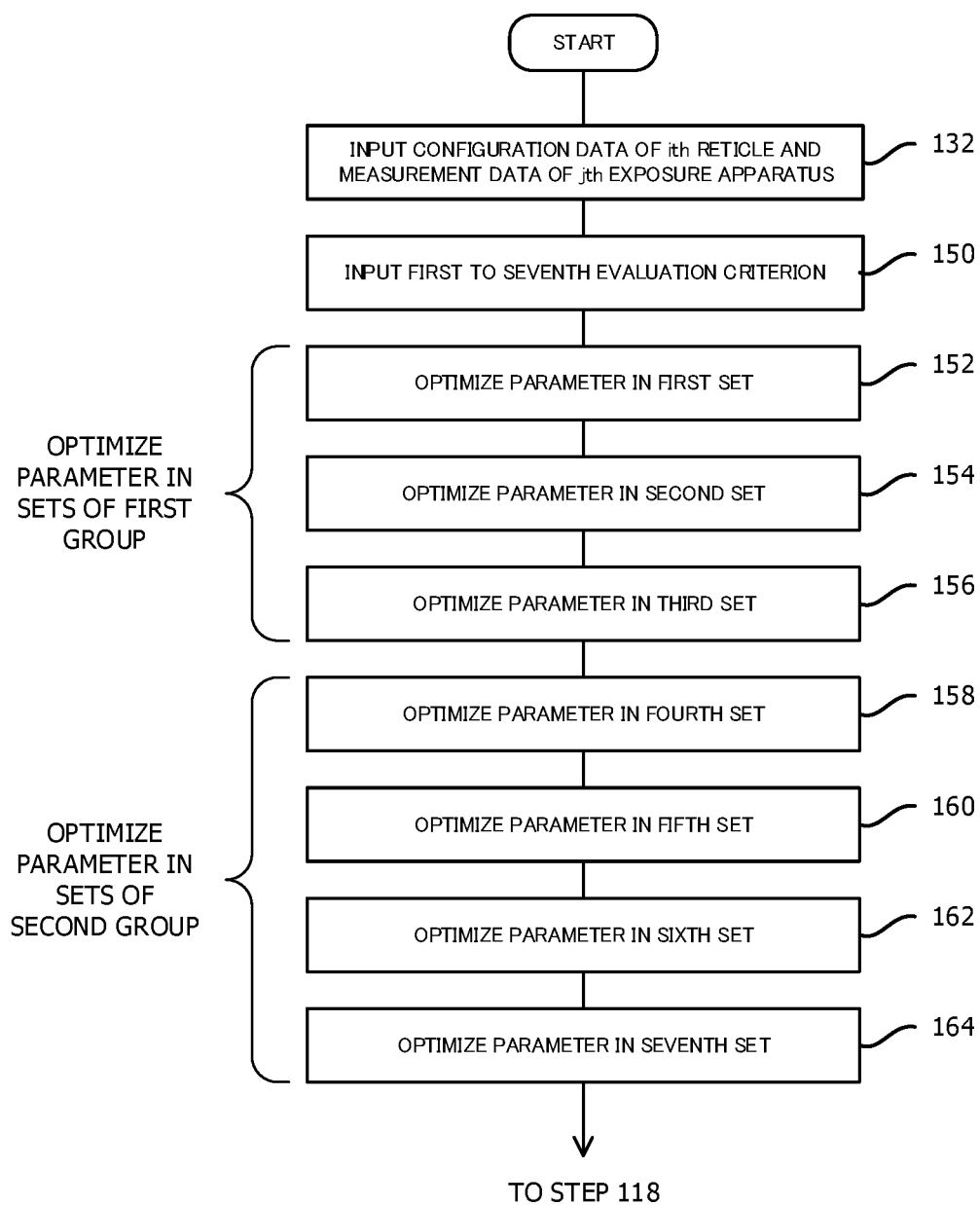

[FIG. 9]
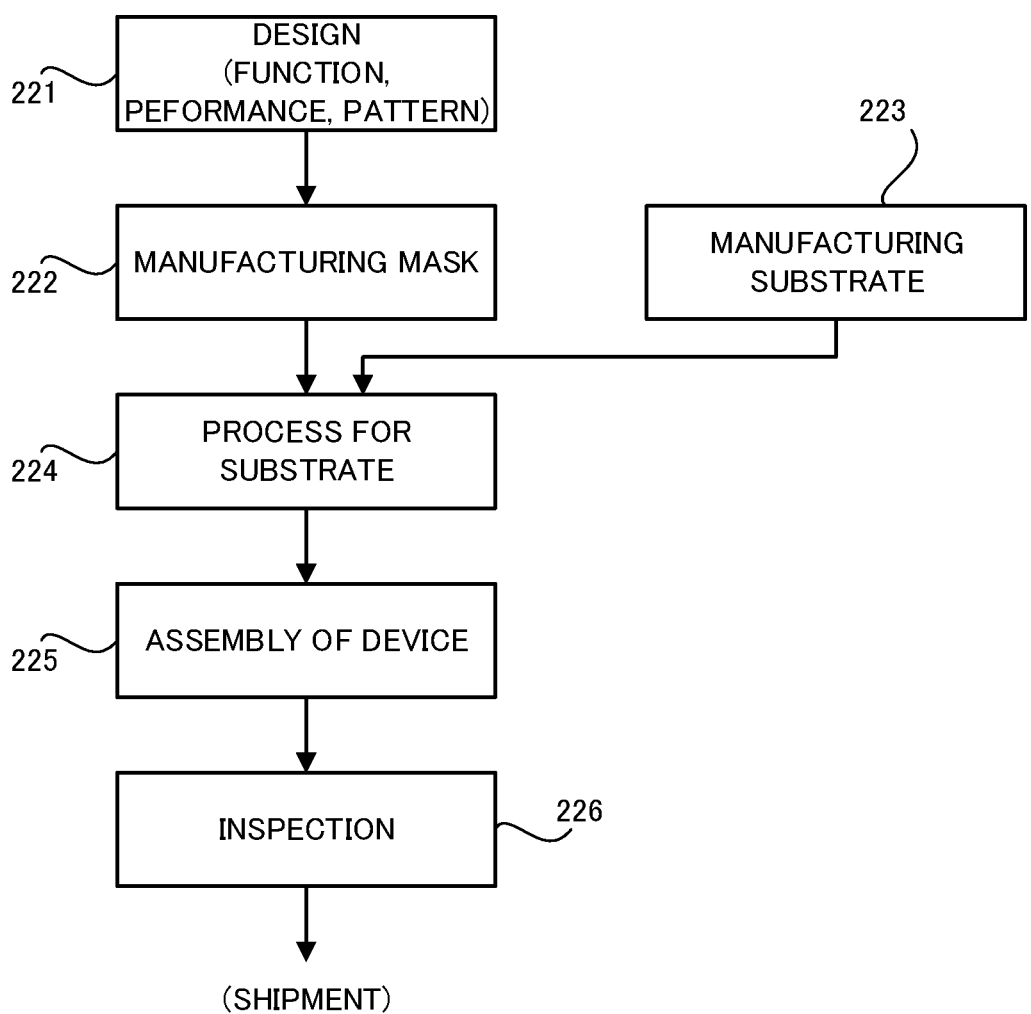

LITHOGRAPHY SYSTEM, SIMULATION APPARATUS, AND PATTERN FORMING METHOD

CROSS-REFERENCE TO RELATED APPLICATIONS

This is a Continuation of application Ser. No. 15/315,073 filed Nov. 30, 2016, which in turn is a National Phase Application of PCT/JP2015/065828 filed on Jun. 1, 2015, which claims the benefit of Japanese Patent Application No. 2014-112235 filed May 30, 2014. The disclosure of the prior applications are hereby incorporated by reference herein in their entirety.

TECHNICAL FIELD

The present invention relates to a lithograph system for forming a patter on a substrate, a simulation apparatus for the lithography system, and a pattern forming method of forming a pattern on a substrate. Moreover, the present invention relates to a device manufacturing method using the lithography system, the simulation apparatus or the pattern forming method.

BACKGROUND ART

For example, in an exposure apparatus (a projection exposure apparatus) that is used at a lithography process for manufacturing an electronic device (or a micro device) such as a semiconductor device, an adjustment of parameter(s) such as a numerical aperture NA of a projection optical system and/or a σ value (what we call a coherence factor) of an illumination light source is performed to match an error of a projected image caused by an optical proximity effect (OPE) among a plurality of exposure apparatuses every time a reticle (a mask) is replaced.

Moreover, a SMO (Source and Mask Optimization) for simultaneously optimizing a pattern of the reticle and the illumination light source is performed recently, and the adjustment of the parameter such as the σ value of the illumination light source may be substantially performed at the same time (for example, see a Patent Literature 1).

CITATION LIST

Patent Literature

Patent Literature 1: International Publication No. WO2011/102109A

SUMMARY OF INVENTION

Technical Problem

As described above, in the exposure apparatus, the adjustment of various parameters is needed to be performed every time the reticle is replaced. However, when a small lot production is performed many time, for example, when custom LSIs are manufactured, the adjustment of the parameter(s) is needed to be performed every time the reticle is replaced and thus there is a possibility that a throughput of an exposure process decreases.

In a same manner, even in an apparatus other than the exposure apparatus that is used at the lithography process, when a small lot production is performed many time the adjustment of the parameter(s) for the process is needed to be performed accordingly and thus there is a possibility that a throughput decreases.

An aspect of the present invention considers this condition and its object is to set a parameter used at a lithography process efficiently.

Solution to Problem

According to a first aspect, there is provided a simulation apparatus for a lithography system configured to form a pattern on a substrate, the simulation apparatus has: a first processing part configured to calculate a value of a parameter in a first set that is calculated relating to the forming of the pattern, and a second processing part configured to calculate a value of a parameter in a second set that is at least partially same as the parameter in the first set and that is calculated relating to the forming of the pattern; and an integration processing part configured to evaluate, on the basis of the value of the parameter in the first set and the value of the parameter in the second set, at least one of a state of the pattern formed on the substrate and a forming condition when the pattern is formed, and to determine on the basis of the result of the evaluation whether or not to make at least one of the first processing part and the second processing part recalculate the value of at least one of the parameters in the first set and the second set.

According to a second aspect, there is provided a simulation apparatus for a lithography system configured to form a pattern on a substrate, the simulation apparatus has: a first processing part configured to calculate a first calculated value of a parameter in a first set that is obtained relating to the forming of the pattern, and a second processing part configured to calculate a second calculated value of a parameter in a second set that includes common parameter being at least partially same as the parameter in the first set and that is obtained relating to the forming of the pattern; and an integration processing part configured to determine the value of the common parameter that is set to the lithography system by using at least one of the first calculated value and the second calculated value.

According to a third aspect, there is provided a lithography system for forming a pattern on a substrate, the lithography system has the simulation apparatus in the aspect of the present invention.

According to a fourth aspect, there is provided a pattern forming method of forming a pattern on a substrate, the pattern forming method includes: obtaining a value of a parameter in a first set relating to the forming of the pattern at a first processing part; obtaining a value of a parameter in a second set relating to the forming of the pattern that is at least partially same as the parameter in the first set at a second processing part; evaluating, on the basis of the value of the parameter in the first set and the value of the parameter in the second set, at least one of a state of the pattern formed on the substrate and a forming condition when the pattern is formed; and determining on the basis of the result of the evaluation whether or not to make at least one of the first processing part and the second processing part recalculate the value of at least one of the parameters in the first set and the second set.

According to a fifth aspect, there is provided a pattern forming method of forming a pattern on a substrate, the pattern forming method includes: obtaining a value of a parameter in a first set relating to the forming of the pattern at a first processing part; obtaining a value of a parameter in a second set relating to the forming of the pattern that includes common parameter being at least partially same as the parameter in the first set at a second processing part; and determining the value of the common parameter that is set to the lithography system by using at least one of the values of the parameter in the first set and the parameter in the second set.

According to a sixth aspect, there is provided a pattern forming method including: the pattern forming method in the aspect of the present invention; and a lithography process at which the pattern is formed on the substrate on the basis of the values of the parameters in the first set and the second set.

According to a seventh aspect, there is provided a management apparatus for a lithography system configured to expose a substrate, the management apparatus has: a first processing part configured to calculate a value of a parameter in a first set that is set to perform the exposure; a second processing part configured to calculate a value of a parameter in a second set that is at least partially same as the parameter in the first set and that is set to perform the exposure; and an integration processing part configured to set the value of the parameter that is common among the parameter in the first set and the parameter in the second set in accordance with a predetermined condition.

According to an eighth aspect, there is provided a device manufacturing method including: forming a predetermined pattern on a substrate by using the lithography system, the simulation apparatus, the management apparatus or the pattern forming method in the aspect of the present invention; and processing a surface of the substrate via the predetermined pattern.

Advantageous Effects of Invention

According to the aspects of the present invention, it is possible to set the parameter used in the lithography process.

BRIEF DESCRIPTION OF DRAWINGS

FIG. 7 is a flowchart illustrating a main part of another example of a method of setting parameters.

FIG. 8 is a flowchart illustrating a main part of additional another example of a method of setting parameters.

FIG. 9 is a flowchart illustrating one example of process for manufacturing an electronic device.

DESCRIPTION OF EMBODIMENTS

In the following description, with reference to FIG. 1 to FIG. 6(C), one example of an embodiment of the present invention will be described.

Figure 1:
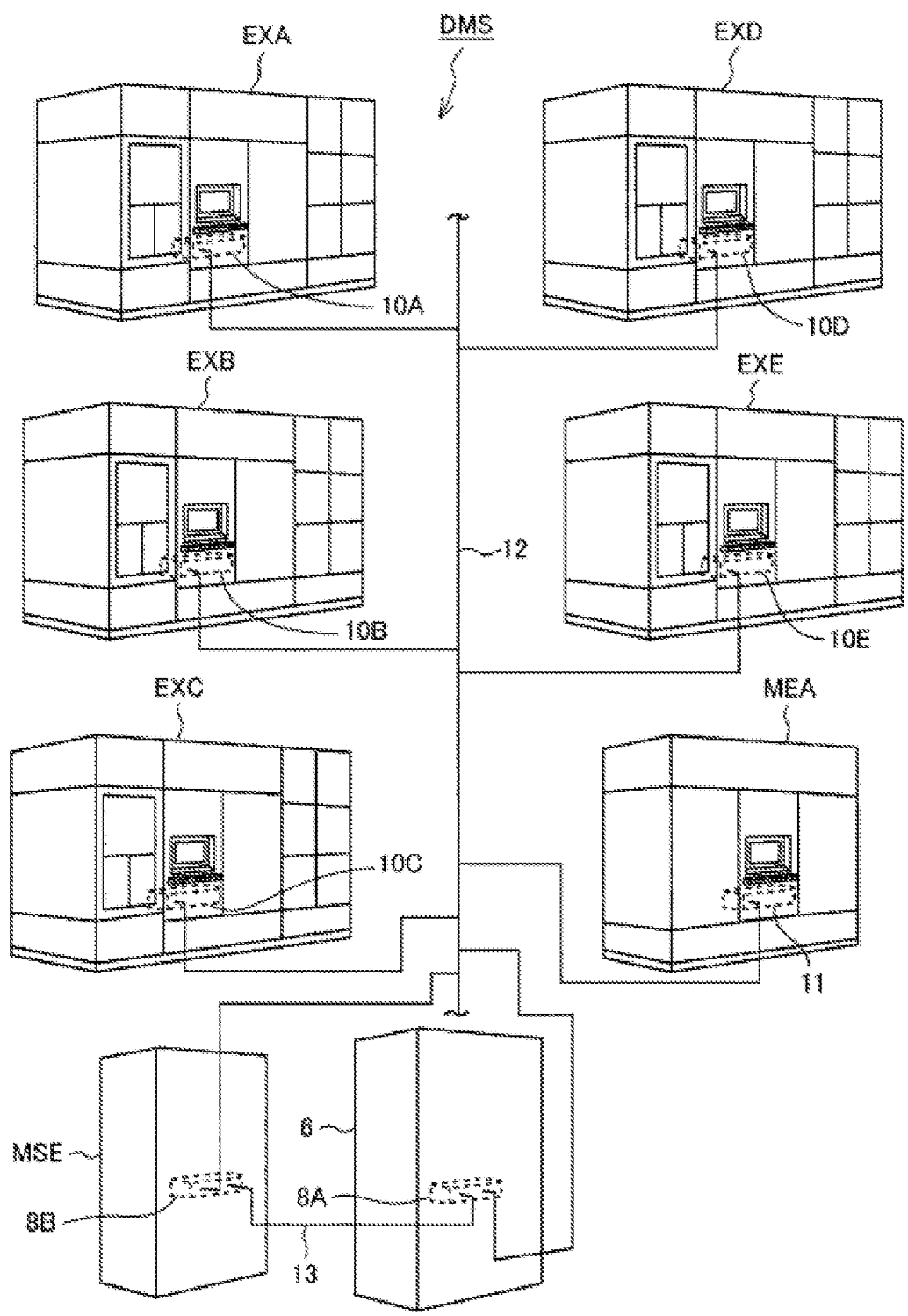
FIG. 1 is a diagram illustrating an exterior view of a lithography system in one example of an embodiment.

FIG. 1 illustrates a lithography system DMS in the present embodiment. In FIG. 1, the lithography system DMS has: a plurality of (five in FIG. 1) exposure apparatuses EXA, EXB, EXC, ECD and EXE; a mask server MSE configured to store pattern information that includes arrangements of patterns of various reticles (masks) used in these exposure apparatuses EXA to EXE and thicknesses of the patterns and that is associated with ID information (identification information) of each reticle; and a master server 6 configured to set various parameters with respect to the exposure apparatuses EXA to EXE. Moreover, the lithography system DMS has: an inspection apparatus MEA such as a scanning electron microscope (SEM) configured to inspect the formed pattern; a communication line 12 such as a LAN (Local Area Network) via which information is transmitted and received among the exposure apparatuses EXA to EXE, the mask server MSE, the master server 6 and the inspection apparatus MEA; and a higher-speed dedicated communication line 13 via which the pattern information and the like is transmitted and received between the mask server MSE and the master server 6.

Moreover, the exposure apparatuses EXA, EXB, EXC, EXD and EXE have communication units 10A, 10B, 10C, 10D and 10E, respectively, each of which is configured to receive parameter information transmitted from the master server 6 via the communication line 12 and to transmit and receive various control information. Similarly, the master server 6 and the mask server MSE have input and output ports (hereinafter, it is referred to as an "IO port") 8A and 8B, respectively, each of which is configured to transmit and receive information via the communication lines 12 and 13, and the inspection apparatus MEA has an IO port 11 that is configured to transmit and receive information via the communication line 12.

Moreover, the lithography system DMS has: a communication line (not illustrated) such as WAN (Wide Area Network) via which information is transmitted and received in a range wider than the communication line 12; a coater/developer (not illustrated) that is connected to this communication line; and a host computer that is configured to transmit and receive process management information and the like from and to the exposure apparatuses EXA to EXE, the mask server MSE, the master server 6, the inspection apparatus MEA and the coater/developer via this communication line. As one example, the lithography system DMS is installed in a manufacturing plant for manufacturing a semiconductor device and the like, and the plurality of exposure apparatuses EXA to EXE are arranged along a plurality of manufacturing lines in the manufacturing plant.

Note that the mask server MSE or the master server 6 may be installed outside the lithography system DMS via a communication line.

Figure 2:
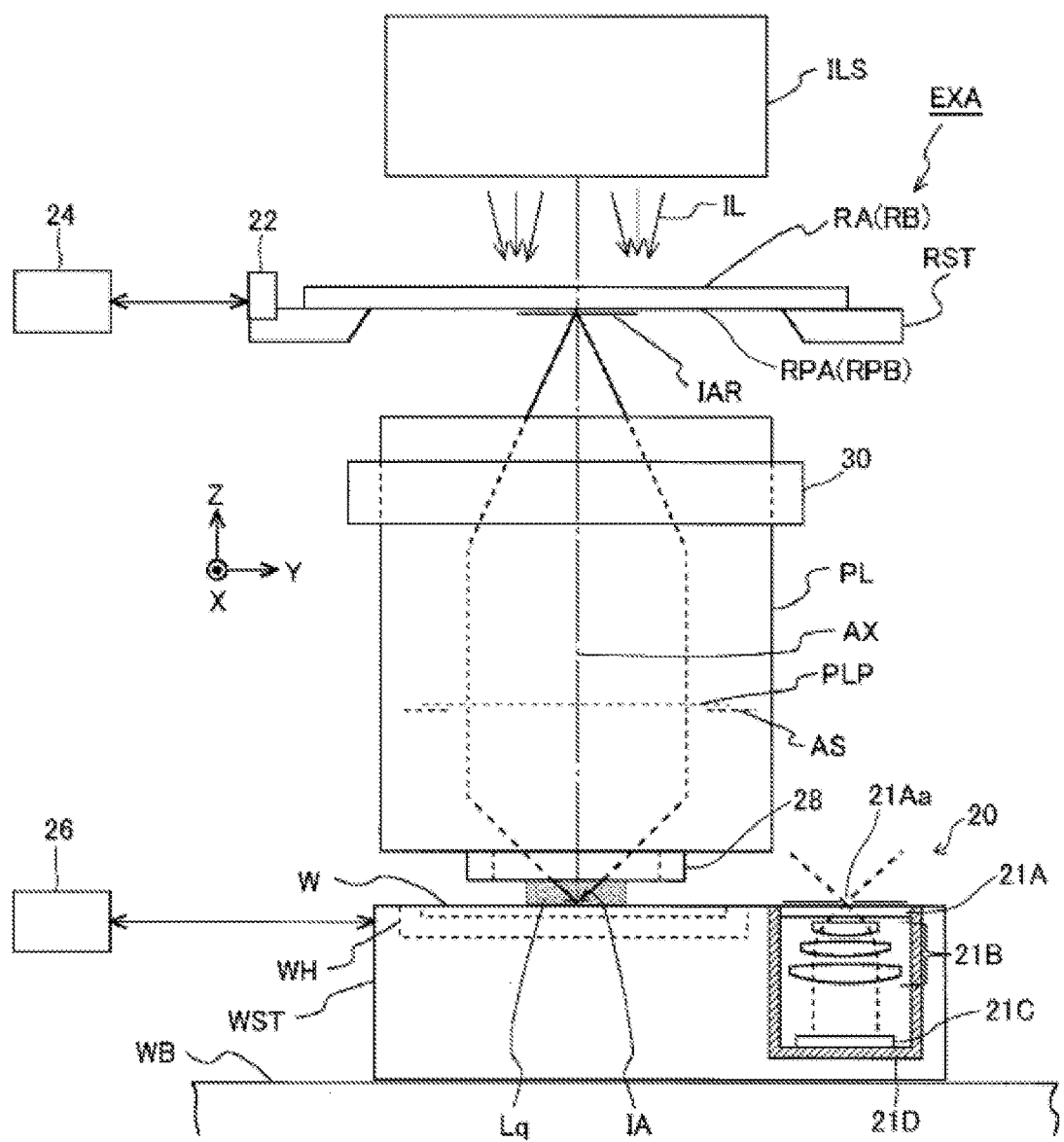
FIG. 2 is a diagram illustrating a schematic structure of a mechanical part of an exposure apparatus in FIG. 1 and illustrating one portion thereof as a cross-sectional view.
Figure 3:
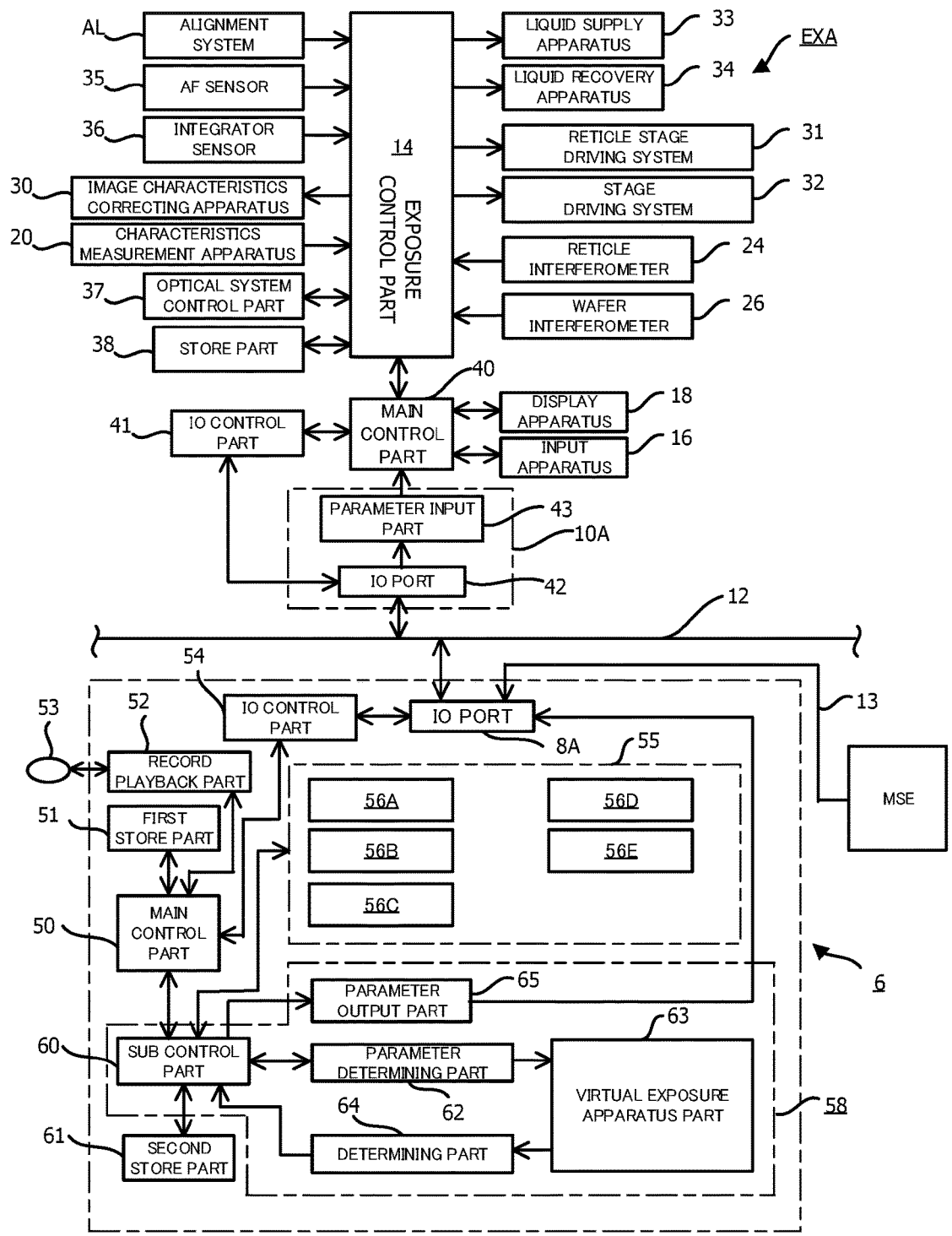
FIG. 3 is a block diagram illustrating a control processing system of a master server in FIG. 1 and a control processing system of a first exposure apparatus.

FIG. 2 illustrate a schematic structure of a mechanical part of the exposure apparatus EXA in FIG. 1, and FIG. 3 illustrate a control processing system of the exposure apparatus EXA and a control processing system of the master server 6 in FIG. 1. In FIG. 2, the exposure apparatus EXA is a scanning exposure type of projection exposure apparatus that is constituted by a scanning stepper (a scanner), as one example. The exposure apparatus EXA has a projection optical system PL. In the following description, a Z axis is set to be in parallel with an optical axis AX of the projection optical system PL, a Y axis is set to be in a direction along which a reticle R and a wafer W are relatively scanned in a plane (a plane substantially parallel with a horizontal plane in the present embodiment) perpendicular to the Z axis, and a X axis is set to be in a direction perpendicular to the Z axis and the Y axis in FIG. 2. Moreover, rotational directions around axes that are parallel to the X axis, the Y axis and the Z axis respectively are referred to as a θX direction, a θY direction and a θZ direction, respectively.

The exposure apparatus EXA has: a light source (not illustrated) for the exposure that is configured to emit illumination light (exposure light) IL for the exposure; an illumination optical system ILS that is configured to illuminate a reticle RA (a mask) by using the illumination light IL from the light source; and a reticle stage RST that is configured to move while holding the reticle RA. Moreover, the exposure apparatus EXA has: the projection optical system PL that is configured to expose a semiconductor wafer (hereinafter, it is simply referred to as a "wafer") W that is coated with resist, by the illumination light IL emitted from the reticle RA; a wafer stage WST that is configured to move while holding the wafer W (a substrate); and a control system (see FIG. 3) including a main control part 40 that is configured to control an operation of the entire apparatus and a exposure control part 14 that is configured to control an exposure operation. The main control part 40 and the exposure control part 14 are functions of a software of a computer.

Again in FIG. 2, ArF excimer laser light (wavelength is 193 nm) is used as the illumination light IL, as one example. Note that KrF excimer laser light (wavelength is 248 nm), harmonic wave of solid state laser (semiconductor laser or the like), EUV light (Extreme Ultraviolet Light) or the like may be used as the illumination light IL. The illumination optical system ILS has: a light intensity distribution forming part such as a Spatial Light Modulator (SLM) that is configured to form a variable light intensity distribution (hereinafter, it is referred to as an "illumination light source") such as a circular shape, a annular shape, a multiple-pole or the like on a pupil plane (hereinafter, it is referred to as an "illumination pupil plane") by using the illumination light IL emitted from the light source (not illustrated); an optical system control part 37 (see FIG. 3) that is configured to drive the light intensity distribution forming part to control a shape of the illumination light source; a condenser optical system that is configured to illuminate a slit-like illumination area IAR elongating in a X direction on a pattern surface (a reticle surface) of the reticle RA by using the illumination light IL from the illumination light source; and a variable field stop that is configured to determine a shape of the illumination area IAR, as disclosed in the United States Patent Application Publication No. 2003/0025890 and the like, for example. A SMO (Source and Mask Optimization) for optimizing the shape of the illumination light source in accordance with the reticle for the exposure target can be applied easily by using the spatial light modulator as the light intensity distribution forming part.

Moreover, an integrator sensor 36 (see FIG. 3) that is constituted by a photoelectric sensor configured to detect a light amount of a light branching from the illumination light IL is installed in the illumination optical system ILS, and a detected value of the integrator sensor is outputted to the exposure control part 14. The exposure control part 14 is allowed to monitor integrated illumination energy that passed through the projection optical system PL by integrating the detected value. Note that exposure continuing time or the like may be used as alternative information of the integrated illumination energy.

The reticle RA is held on an upper surface of the reticle stage RST by vacuum suction, and a device pattern RPA such as a circuit pattern and an alignment mark (not illustrated) are formed on the reticle surface. The reticle state RST is movable slightly in a XY plane and is movable at a designated scan speed in a scan direction (a Y direction) by a reticle stage driving system 31 in FIG. 3 including a linear motor or the like, for example.

Position information (including positions in the X direction and the Y direction and rotational angle in the θZ direction) of the reticle stage RST in a moving plane is continuously detected by a reticle interferometer 24 that is constituted by a laser interferometer via a movable mirror 22 (or end surface of the stage that is mirror-polished) with a resolution of 0.5 nm to 0.1 nm, for example. The detected value of the reticle interferometer 24 is outputted to the exposure control part 14 in FIG. 3. The exposure control part 14 is configured to control the position and speed of the reticle stage RST by controlling the reticle stage driving system 31 on the basis of the detected value.

Moreover, the projection optical system PL is a both-sides telecentric system and has a predetermined projection magnification β (for example, a reduction magnification such as ¼ times), for example. An aperture stop AS is installed at or near a pupil plane (hereinafter, it is referred to as a "projection pupil plane") PLP of the projection optical system PL. The optical system control part 37 (see FIG. 3) is configured to drive the aperture stop AS to control a numerical aperture NA of the projection optical system PL. The projection pupil plane PLP is optically conjugate to the pupil plane (the illumination pupil plane) of the illumination optical system ILS, and the projection pupil plane PLP is also an optical Fourier transform plane with respect to the pattern surface of the reticle RA (object plane of the projection optical system PL). Note that the projection optical system PL may be a type of system forming intermediate image. Moreover, the projection optical system PL may be a dioptric system or may be a catadioptric system. When the illumination area IAR on the pattern surface of the reticle RA is illuminated by the illumination light IL from the illumination optical system ILS, an image of the device pattern in the illumination area IAR is formed on an exposure area IA (an area optically conjugate to the illumination area IAR) on one shot area on the wafer W by the illumination light IL that has passed through the reticle RA through the projection optical system PL. The wafer W includes, as one example, a circular base material that is constituted by the semiconductor such as a silicon and that has a diameter of about 200 mm to 450 mme and on which resist (photosensitive material) having a thickness of tens of nanometer to 200 nm is coated.

Moreover, in order to allow the exposure apparatus EXA to expose by using liquid immersion method, a nozzle unit 28 that is one portion of a local liquid immersion apparatus and that is configured to supply and recover liquid Lq (for example, purified water) for the exposure to and from a liquid immersion area including the exposure area IA is installed to surround a lower end part of an optical element that is closest to an image plane (the wafer W) and that constitutes the projection optical system PL. The nozzle unit 28 is connected to a liquid supply apparatus 33 and a liquid recovery apparatus 34 (refer to FIG. 3) via a pipe that is for supplying the liquid Lq. Note that the above described local liquid immersion apparatus may not be installed, if the liquid immersion type of exposure apparatus is not used.

Moreover, an image characteristics correcting apparatus 30 that is configured to control attitudes of a plurality of predetermined inner lenses to correct image characteristics represented by wavefront aberration such as distortion and spherical aberration is installed in the projection optical system PL. This image characteristics correcting apparatus 30 is disclosed in the United States Patent Application Publication No. 2006/244940, for example.

Moreover, the exposure apparatus EXA has: an alignment system AL including spatial image measurement system (not illustrated) that is configured to measure a position of an image of the alignment mark on the reticle RA generated by the projection optical system PL and an image processing type (FIA system type) of sensor, for example, that is configured to measure a position of an alignment mark on the wafer W; and an oblique incident type of automatic focusing sensor (hereinafter, it is referred to as an "AF system") 35 (refer to FIG. 3) for multipoint that is configured to measure Z positions of a plurality of points on a front surface of the wafer W. Information measured by the alignment system AL and the like is outputted to the exposure control part 14. Moreover, the exposure apparatus EXA has a reticle loader system (not illustrated) and a wafer loader system (not illustrated).

Moreover, the wafer stage WST is supported in a non-contact manner by an upper surface that is parallel to the XY surface of a base plate WB via a plurality of non-illustrated air pads. The wafer stage WST is movable in the X direction and the Y direction by a stage driving system 32 (see FIG. 3) including a planar motor or two pairs of linear motors that are orthogonal to each other, for example. The wafer stage WST has: a stage body that is moved in the X direction and the Y direction; a mechanism that is configured to adjust a rotational angle of the stage body in the θZ direction; and a Z stage mechanism that is installed in the stage body and that is configured to control the Z position and tilt angles in the θX direction and the θY direction of the wafer W and a wafer holder WH that is configured to hold the wafer by vacuum suction or the like.

Moreover, a wafer interferometer 26 that is constituted by a laser interferometer is installed to measure position information of the wafer stage WST. The position information (including positions in the X direction and the Y direction and rotational angle in the θZ direction) of the wafer stage WST in a moving plane is continuously detected by the wafer interferometer 26 with a resolution of 0.5 nm to 0.1 nm, for example, and the detected value is outputted to the exposure control part 14. The exposure control part 14 is configured to control the position and speed of the wafer stage WST by controlling the stage driving system 32 on the basis of the detected value. Note that a position measurement system in an encoder method using a diffraction grating and a detector, instead of the wafer interferometer 26.

Moreover, a characteristics measurement apparatus 20 that is allowed to measure light intensity distribution (light amount distribution) on the projection pupil plane PLP is embedded in the wafer stage WST. The characteristics measurement apparatus 20 has: a plate-like glass substrate 21A including a surface that is located at a same height as a surface of the wafer W and on which a pin hole 21Aa is formed; a light receiving optical system 21B that is configured to collect the illumination light that has passed through the pin hole 21Aa; a two-dimensional imaging element 21C in a CCD type or a CMOS type that is configured to receive the illumination light that is collected by the light receiving optical system 21B; and a case 21D that is configured to hold these members. The light receiving optical system 21B allows a light receiving surface of the imaging element 21C to be optically conjugate to the projection pupil surface PLP (or an exit pupil), when the pin hole 21Aa moves to be in the exposure area IA. The light intensity distribution (an image) on the projection pupil plane PLP (or an entrance pupil or the exit pupil) is allowed to be measured by image-processing the detected signal of the imaging element 21C at a processing part (not illustrated). Moreover, a predetermined aberration of the projection optical system PL is also allowed to be measured by processing an image that is obtained when a test reticle (not illustrated) on which a plurality of predetermined diffraction grating patterns are formed is set instead of the reticle RA, for example. Information relating to the measured light intensity distribution or aberration is outputted to the exposure control part 14.

Moreover, the exposure apparatus EXA has: a store part 38 that is configured to store values of a plurality of parameters transmitted from the master server 6, the measured values of the alignment system AL and the AF sensor 35, an exposure data file (an exposure recipe) for the exposure apparatus EXA and the like; an IO port 42 connected to the communication line 12; an input and output control part (hereinafter, it is referred to as an "IO control part") 41 that is configured to control an input and an output of the information from and to the master server 6, the host computer (not illustrated) and the like via the IO port 42; and a parameter input part 43 to which the parameters that is supplied from the master server 6 via the communication line 12 and the IO port 42 are inputted. A display apparatus 18 and an input apparatus 16 are connected to the main control part 40, and an operator is allowed to input various commands and the like to the main control part 40.

The communication unit 10A is constituted by the IO port 10A and the parameter input part 43. As described later, the plurality of parameters that are transmitted to the parameter input part 43 from the master server 6 are stored in the store part 38 via the main control part 40 and the exposure control part 14, and corresponding parameter is set to each of the image characteristics correcting apparatus 30, the optical system control part 37 and the like.

The wavelength of the illumination light IL of the exposure apparatus EXA, an arrangement information of optical members that constitute the illumination optical system ILS and the projection optical system PL, resolution of the projection optical system PL, the wavefront aberration of the projection optical system PL that is correctable by the image characteristics correcting apparatus 30 and its correctable range, positioning accuracies of the reticle stage RST and the wafer stage WST, information such as an alignment accuracy and the like of the alignment system AL, and information relating to the parameter that is needed to be set (hereinafter, these are referred to as "configuration information of the exposure apparatus") are stored in the store part 38 and are also stored in a first store part 51 (see FIG. 3) of the master server 6 with them being associated with ID information of the exposure apparatus EXA.

The structure of each of the other exposure apparatuses EXB to EXE in FIG. 1 is same as that of the exposure apparatus EXA, and the configuration information of each of the exposure apparatuses EXB to EXE is also stored in the first store part 51 (see FIG. 3) of the master server 6 with it being associated with ID information of each of the exposure apparatuses EXA to EXE. Note that the configuration information of the exposure apparatus maybe transmitted to the master server 6 via the communication line 12, if needed. Moreover, types of the exposure apparatuses EXA to EXE may be different from one another. As one example, the exposure apparatus EXA may be the liquid immersion type, the exposure apparatus EXB may be a dry type. Moreover, the exposure apparatus EXC may be a collective exposure type stepper.

When the exposure apparatus EXA exposes the wafer W, the alignment of the reticle RA and the wafer W are performed, and then a shot area on the wafer for the exposure target moves just before the exposure area of the projection optical system PL by way of the wafer stage WST moving in the X direction and the Y direction (a step movement), as a basis operation. Then, under the control of the exposure control part 14, the reticle R and the wafer W are scanned in the Y direction with respect to the projection optical system PL by using the projection magnification as a speed ratio, for example, by synchronously moving the reticle stage RST and the wafer stage WST while the shot area on the wafer W is exposed by the image of one portion of the pattern of the reticle R that is generated by the projection optical system PL, and thus the entire surface of the shot area is scanning exposed by the image of the pattern of the reticle R. The plurality of the shot areas on the wafer W are exposed by the image of the pattern of the reticle R in order in a step and scan method by repeating the step movement and the scanning exposure.

When the exposure is performed, the values of the various parameters are needed to be set in advance in accordance with the pattern of the reticle RA and the configuration of the exposure apparatus EXA. Moreover, if the values of the parameters are adjusted to be set every time the reticle is replaced when a small lot production is performed many time, for example, when custom LSIs are manufactured, there is a possibility that a throughput of an exposure process decreases. In the present embodiment, the master server 6 is installed to efficiently set the values of the parameters.

In FIG. 3, the master server 6 is a computer having a plurality of CPUs (Central Processing Units) or MPUs, a semiconductor memory and a large capacity store apparatus such as a hard disk apparatus. Moreover, the master server 6 has: an IP port 8A for the transmitting and the receiving to and from the communication lines 12 and 13; a record and playback part 52 that is configured to read data and program recorded in a recording medium 53 such as a DVD (Digital Versatile Disk) or a flash memory and to write data onto the recording medium 53; the first store part 51 and a second store part 52 that are one portion of the store apparatus; an input apparatus (not illustrated) by which the operator input the control information and the like; a display apparatus that is configured to display various information; and various functions on the software of the computer that are described later.

The functions on the software include: a main control part 50 (for example, an operation system) that is configured to totally control the operation of the entire master server 6; an IO control part 54 used by the main control part 50 to control the IO port 8A; a parameter calculating part 55 that is configured to calculate the parameter in each of a plurality of sets; and an integration calculating part 58 that is configured to evaluate all of the parameters calculated by the parameter calculating part 55 and makes the parameter calculating part 55 recalculate the parameter if needed. The pattern information of the reticle and the configuration information of the exposure apparatus and the like that are targets for setting the parameters are stored in the first store part 51. Moreover, the second store part 61 is used by the integration calculating part 58. Each of these various functions on the software is realized by way of the main control part 50 reading the program recorded on the recording medium 53, storing the read program in the first store part 51 and executing the program corresponding to the necessary function, for example.

And, the parameter calculating part 55 has first, second, third, fourth and fifth calculating parts 56A, 56B, 56C, 56D and 56E that are configured to calculate the values (the calculated values) of the parameters in first, second, third, fourth and fifth sets to optimize them, respectively, as one example. Each of these calculating parts 56A to 56E is configured to optimize the value of the parameter in corresponding set for each combination of the reticle and the exposure apparatus. Thus, the calculating parts 56A to 56E are allowed to voluntary access the pattern information of the reticle and the configuration information of the exposure apparatus that are the targets for the optimization and that are stored in the first store part 51. As one example, the configuration information of each of the exposure apparatuses EXA to EXE is stored in the first store part 51 in advance, and the pattern information of each reticle is stored in the first store part 51 from the mask server MSE via the communication line 13, the IO port 8A, the IO control part 54 and the main control part 50 if needed. Note that the parameter calculating part 55 may have only two calculating parts that are configured to calculate the parameters in at least two sets. Moreover, each set includes at least one parameter.

As one example, the first calculating parts 56A is configured to optimize the values of "an exposure amount (a dose) Dz and a focus position (an offset of an exposure surface of the wafer W with respect to the image plane of the projection optical system PL) bf" that are the parameters in the first set to maximize CDU (Critical Dimension Uniformity) (uniformity of a line width of the image of the pattern having projectable minimum line width) in the exposure apparatus.

The second calculating part 56B is configured to optimize the values of "a σ value (what we call a coherence factor) of the illumination light source, the numerical aperture NA of the projection optical system PL, the exposure amount Dz, the focus position bf, and a parameter defining the residual wave aberration of the projection optical system PL" that are the parameters in the second set to match characteristics (hereinafter, it is referred to as an "OPE characteristics") of the projected image due to an optical proximity effect (hereinafter, it is referred to as an "OPE") among the plurality of the exposure apparatuses. First order to a predetermined order of coefficients Zai (i=1, 2, . . . ) of Zernike polynomial are used as one example of the parameters defining the residual wavefront aberration of the projection optical system PL.

The third calculating part 56C is configured to obtain, in order to minimize variation amount of the image characteristics of the projection optical system PL due to irradiated energy of the exposure light (variation amount varied in accordance with the pattern of the reticle) in the exposure apparatus, the values of "a saturation value Sab of the variation amount of the image characteristics due to the irradiated energy and a time constant τ" that are the parameters in the third set (the parameter for a lens control). If the image characteristics correcting apparatus 30 works on the basis of the values of the parameters in the third set, the variation amount of the image characteristics of the projection optical system PL due to the irradiated energy is minimized, and thus obtaining the values of the parameters in the third set substantially means optimizing control amount of the image characteristics correcting apparatus 30.

The fourth calculating part 56D is configured to optimize the values of "a parameter pg defining an arrangement (a grid) of the plurality of shot areas on the wafer for the exposure target and a residual distortion dis of the projection optical system PL" that are the parameters in the fourth set to reduce an overlay error in the exposure apparatus. The residual distortion dis of the projection optical system PL is also represented by a predetermined order j of the coefficient Zbj (a plurality of coefficients may be used) of Zernike polynomial, as one example.

The fifth calculating part 56E is configured to optimize the values of "the σ value of the illumination light source, the numerical aperture NA of the projection optical system PL, and the parameter defining the residual wavefront aberration of the projection optical system PL" that are the parameters in the fifth set to minimize an error of the projected image remaining even when what we call an OPC (optical proximity correction) is performed to the pattern of the reticle and an error of the projected image due to the manufacturing error of the pattern of the reticle (hereinafter, these errors are collectively referred to as a "residual error of the reticle pattern image").

In a following table 1, the parameters optimized by the first to fifth calculating parts 56A to 56E are illustrated with circles. In the table 1, the parameter for defining the shape of the illumination light source is the σ value of the illumination light source, and the parameter for controlling the aberration of the projection optical system includes the numerical aperture NA of the projection optical system PL, the parameter for defining the residual wavefront aberration of the projection optical system PL, the saturation value Sab of the variation amount of the image characteristics due to the irradiated energy and the time constant τ.

TABLE 1

| Parameter calculating part | Parameter to be optimized | | | | |
|---|---|---|---|---|---|
| | Definition of shape of illumination light source | Control of aberration of projection optical system | Exposure amount | Focus position | Priority order |
| First calculating parts | | | ○ | ○ | 1 |
| Second calculating part | ○ | ○ | ○ | ○ | 2 |
| Third calculating part | | ○ | | | 3 |
| Fourth calculating part | | ○ | | | 4 |
| Fifth calculating part | ○ | ○ | | | 5 |

The table 1 describes that at least one portion of the parameters (the parameters in the first to fifth sets) that are optimized by the first to fifth calculating parts 56a to 56E is common among the sets. For example, "the σ value of the illumination light source" in the parameters in the second set optimized by the second calculating part 56B is same as "the σ value of the illumination light source" in the parameters in the fifth set optimized by the fifth calculating part 56E, and "the exposure amount Dz and the focus position bf" in the parameters in the first set optimized by the first calculating part 56A are same as "the exposure amount Dz and the focus position bf" in the parameters in the second set optimized by the second calculating part 56B. Similarly, "the parameter defining the residual wavefront aberration (or the distortion) of the projection optical system PL" in the parameters in the second set, the third set, the fourth set and the fifth set optimized by the second calculating part 56B, the third calculating part 56C, the fourth calculating part 56D and the fifth calculating part 56E are same as one another.

As described above, if there is a common parameter among the parameters optimized by the first to fifth calculating parts 56A to 56E and the values of the common parameters optimized by the first to fifth calculating parts 56A to 56E are different from one another, there is a problem which value is set to the value of the common parameter. Thus, in the present embodiment, the priority order is set to the parameters in the first to fifth sets optimized by the first to fifth calculating parts 56A to 56E as illustrated in the table 1, as one example. The priority order means that the smaller number is prioritized more, and the value of the parameter in the first set having the priority order 1 is set to the exposure apparatus the most preferentially. Note that the priority order is set so that the parameter such as a CD (Critical Dimension) relating to the most important characteristics in the exposure apparatus is prioritized more. However, the priority order may be changed in accordance with a minimum pitch of the pattern of the reticle, an exposure layer on the wafer and the like, and may be set to any desired order.

Moreover, setting the value (for example, the exposure amount Dz1) of the parameter in the first set to more preferential parameter than the value (for example, the exposure amount Dz2) of the parameter in the second set means setting a weighting a1 larger than a weighting b1, wherein a1 and b1 (a1 and b1 are actual numbers larger than 0) are the weightings for the parameters in the first set and the second set, respectively, as one example. In this case, the value of the exposure amount Dz3 that is set to the exposure apparatus is a weighted average of the exposure amounts Dz1 and Dz2 as described later. Note that the value of the exposure amount Dz3 that is set to the exposure apparatus is Dz1 if the weighting b1 is set to be zero.

Moreover, when the value (for example, the value of the exposure amount Dz3 that is set to the exposure apparatus) of the common parameter included in each of sets is set, an average value of the values of the parameters in the sets may be used. Moreover, the weightings a1 and b1 may be substantially same as each other and the weightings for the parameters in the first set and the second set may be equated.

$$Dz3 = (a1 \times Dz1 + b1 \times Dz2)/(a1 + b1) \qquad (1)$$

Note that the weighting assigned to the parameter in the first set to the fifth set may be different for each parameter.

Next, the integration calculating part 58 has: a sub control part 60 that is configured to make each of the calculating parts 56A to 56E in the parameter calculating part 55 calculate the parameter in the corresponding set; a parameter determining part 62 that is configured to determine the values of all parameters on the basis of the above described priority order from the values of the parameters in five sets calculated by the calculating parts 56A to 56E; a virtual exposure apparatus part 63 (an evaluation part); a determining part 64; and a parameter output part 65 that is configured to output the values of the finally determined parameters to either one of the communication units 10A to 10E in the exposure apparatuses EXA to EXE via the IO port 8A and the communication line 12. The virtual exposure apparatus part 63 is configured to calculate, on the software, the light intensity distribution of a spatial image that is obtained by projecting the pattern of the reticle RA through the projection optical system PL, by using the pattern information of the used reticle (here, it is regarded as the reticle RA), the configuration information of the exposure apparatus (here, it is regarded as the exposure apparatus EXA) and the values of their all parameters (or one portion of the parameters). Thus, the virtual exposure apparatus part 63 and the sub control part 60 are allowed to voluntary access the pattern information of the reticle and the configuration information of the exposure apparatus that are stored in the first store part 51.

Moreover, the virtual exposure apparatus part 63 is configured to obtain a position and a shape of virtual resist pattern by binarizing the light intensity distribution with a threshold value corresponding to the exposure amount, to obtain the position and the shape of the virtual resist pattern that has changed due to the irradiated energy when the exposure is continued, and to obtain (evaluate) a predicted value of the exposure result including information relating to the CDU, the OPE characteristics, the variation amount of the image characteristics of the projection optical system PL due to the irradiated energy of the exposure light, the overlay error and the residual error of the reticle pattern image, on the basis of these information of the position and the shape of the virtual resist pattern. The information relating to the predicted value of the exposure result is outputted to the determining part 64.

The determining part 64 is configured to compare the predicted value of the exposure result outputted from the virtual exposure apparatus part 63 or the predicted value of each exposure result obtained by each of the calculating parts 56A to 56E in the parameter calculating part 55 with an evaluation criterion (for example, a criterion determining that it is allowable if it is in a numerical range or larger than or equal to (or smaller than or equal to) a threshold value) that is set in advance, to determine whether or not the predicted value of each exposure result satisfies with the evaluation criterion, and to output the determination result to the sub control part 60. The sub control part 60 makes the calculating part 56A to 56E in the parameter calculating part 55 recalculate the values of the parameters in the first set to the fifth set, respectively, as one example, if there is the predicted value of the exposure result that does not satisfy with the evaluation criterion. And, the sub control part 60 transmits the recalculated parameters in five sets to the virtual exposure apparatus part 63 via the parameter determining part 62, and makes the predicted value of the exposure result be calculated again.

And, if the predicted value of each exposure result satisfies with the evaluation criterion, the sub control part 60 makes the second store part 61 store the values of the parameters (all parameters included in five sets or one portion the parameters) determined by the parameter determining part 62 with them being associated with the ID information of the reticle RA and the exposure apparatus EXA. The values of the parameters are calculated for each combination of each reticle and each of the exposure apparatuses EXA to EXE, and the calculated values of the parameters are stored in the second store part 61 with them being associated with the ID information of the reticle RA and the exposure apparatuses EXA to EXE. Note that the used parameters may be different for each combination of the reticle and the exposure apparatus.

In the following description, one example of a method of calculating the values of the parameters for the exposure apparatuses EXA to EXE and a method of forming the pattern (a pattern forming method) by performing the exposure using the calculation result in the lithography system DMS in the present embodiment will be described with reference to FIG. 4. It is assumed that I (I is an integer larger than or equal to 1) reticles are used, there is J (J is an integer larger than or equal to 1, and J is 5 in FIG. 1) exposure apparatuses and the parameters to be set are categorized into K (K is an integer larger than or equal to 2) sets. Since the parameter calculating part 55 in FIG. 3 has five calculating parts 56A to 56E, the following description uses an example in which K is 5.

Figure 4:
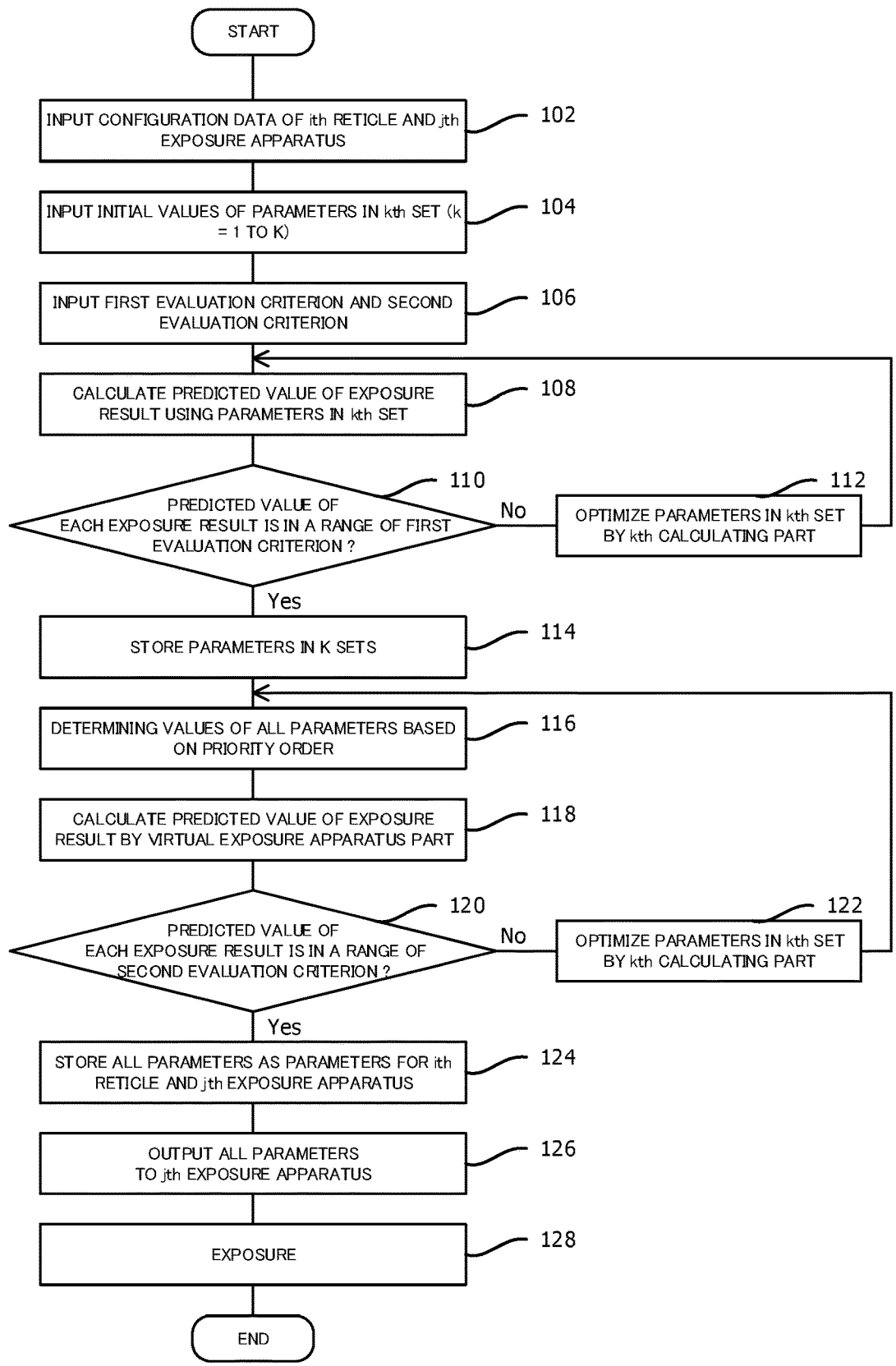
FIG. 4 is a flowchart illustrating one example of a method of setting parameters.
Figure 5:
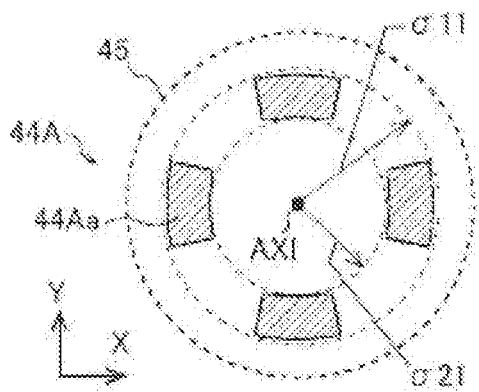
FIG. 5(A) is a diagram illustrating one example of an illumination light source.
FIG. 5(B) is a diagram illustrating one example of an illumination light source after a first modification.
FIG. 5(C) is a diagram illustrating one example of an illumination light source after a second modification.
FIG. 5(d) is a diagram illustrating one example of a finally set illumination light source.
Figure 5:
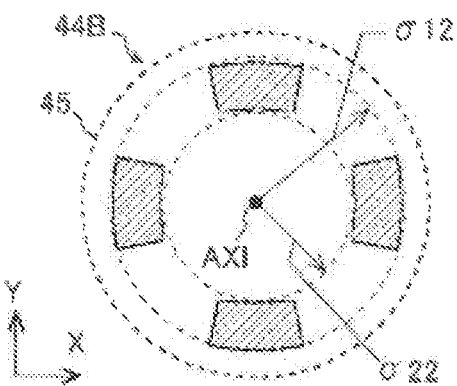
Figure 5:
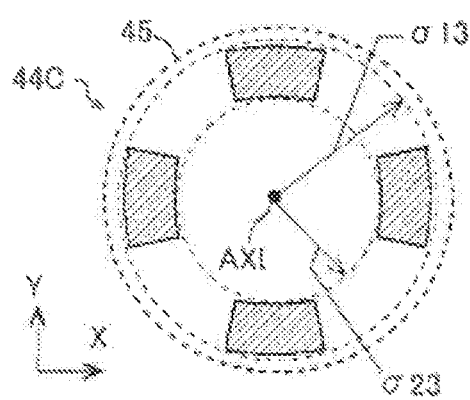
Figure 5:
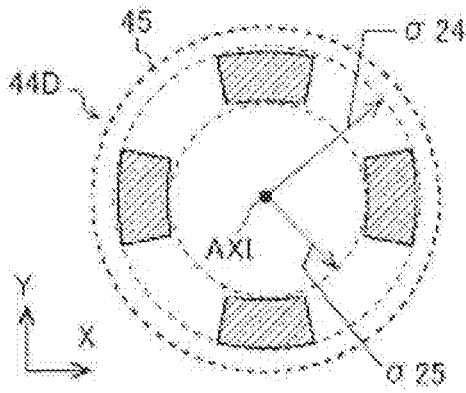
Figure 6:
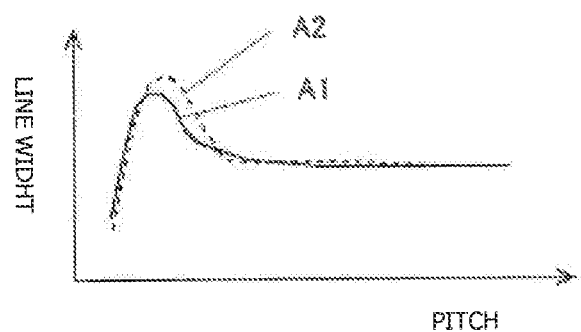
FIG. 6(A) is a diagram illustrating one example of OPE characteristics.
FIG. 6(B) is a diagram illustrating one example of process window.
FIG. 6(C) is a diagram illustrating one example of adjusted process window.
Figure 6:
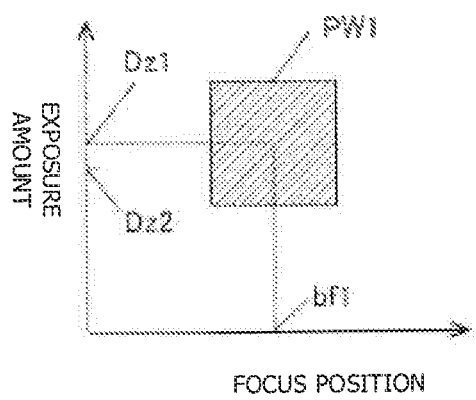
Figure 6:
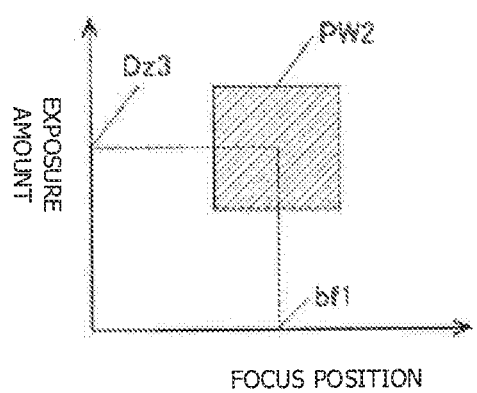

Firstly, at a step 102 in FIG. 4, the operator inputs a command to the main control part 50 at the master server 6 to determine the values of the parameters for I reticles and J exposure apparatuses. In response to this, the determination of the values of the parameters in the case where the exposure is performed by using the ith (i=1 to I) reticle in the jth (j=1 to J) exposure apparatus will be described. Firstly, the main control part 50 obtains the pattern information (configuration data) of the ith reticle from the mask server MSE via the communication line 13 and inputs it to the first store part 51, if the first store part 51 does not store the pattern information of the ith reticle. Similarly, the main control part 50 obtains the configuration information (configuration data) of the jth exposure apparatus from the jth exposure apparatus via the communication line 12 and inputs it to the first store part 51, if the first store part 51 does not store the configuration information of the jth exposure apparatus.

Note that all of the pattern information of the reticle and the configuration information of the exposure apparatus are not needed to be obtained, and only one portion of the pattern information of the reticle or one portion of the configuration information of the exposure apparatus may be obtained.

As one example, the configuration information includes a types of parameter that is needed to be set, an initial value (a designated value) of the parameter that is needed to be set, the evaluation criterions $ES_k$ (k=1 to 5) of the predicted value of the exposure result used when the values of the parameters in a plurality of sets (five sets in the present embodiment) are determined, and the weighting for the parameters in each of five sets (priority order information). Moreover, the evaluation criterion $ES_k$ includes a first evaluation criterion $ESA_k$ used when each of the calculating parts 56A to 56E optimizes the values of the parameters in the corresponding set and a second evaluation criterion $ESB_k$ used when the predicted value of the exposure result that has been calculated by using the values of the parameters at the virtual exposure apparatus part 63 is evaluated, as one example. Here, the first evaluation criterion $ESA_k$ may be same as the second evaluation criterion $ESB_k$. Moreover, the second evaluation criterion $ESB_k$ may be in a narrower (stricter) range than the first evaluation criterion $ESA_k$.

Then, the main control part 50 inputs a command to the sub control part 60 in the integration processing part 58 to determine the values of the parameters for the ith reticle (hereinafter, it is regarded as the reticle RA) and the jth exposure apparatus (hereinafter, it is regarded as the exposure apparatus EXA). In response to this, the sub control part 60 recognizes the parameter that is needed to be set from apparatus information of the exposure apparatus EXA, and identifies the parameters in the set in which the recognized parameter is included. Here, it is assumed that the values of the parameters in the first to fifth sets are determined. In this case, the sub control part 60 inputs the initial values of the parameters in a kth (k=1 to 5) set into a kth calculating part (either one of 56A to 56E) in the parameter calculating part 55 (a step 104), and inputs the first evaluation criterion ESAk and the second evaluation criterion ESBk for the predicted value of the exposure result into the determining part 64 (a step 106).

Next, the sub control part 60 makes the kth calculating part in the parameter calculating part 55 individually calculate the predicted value of the exposure result by using the parameters in the kth set (a step 108). In this calculation, if the value of the parameter in another set is needed, the initial value of this parameter may be used, as one example. The steps 104, 106 and 108 are performed for each of the five sets of the parameters (each of five calculating parts 56A to 56E). Five predicted values of the exposure results are transmitted to the determining part 64, and the determining part 64 evaluate whether or not each of the five predicted values of the exposure results is within a range of the above described first evaluation criterion ESAk (k=1 to 5), namely, satisfies with the first evaluation criterion ESAk (a step 110).

As one example, the predicted value of the exposure result obtained by the first calculating part 56A is the exposure amount that is needed to make the above described CDU be larger than or equal to a predetermine value and a process window PW1 (see FIG. 6(B)) that represents a width (range) within which the focus position is movable, as one example. The exposure amount Dz1 (the best dose) at the center of the process window PW1 and the focus position bf1 (the best focus position) corresponding to this center are the parameters in the first set. Therefore, the first evaluation criterion ESA1 corresponding to the parameters in the first set includes a width $\Delta dz$ of the exposure amount and a width $\Delta bf$ of the focus position on the process window, and the predicted value of the exposure result obtained by the first calculating part 56A satisfies with the first evaluation criterion ESA1 if the widths of the obtained process window PW1 are larger than or equal to $\Delta dz$ and $\Delta bf$.

Moreover, as one example, the above described OPE characteristics that is the predicted value of the exposure result obtained by the second calculating part 56B is a dashed and curved line A2 that is obtained by plotting, in connection with pitches, the line width of the image obtained when the images of various line-and-space patterns having same line widths and different pitches are exposed, as illustrated in FIG. 6(A). On the other hand, a solid and curved line A1 represents a characteristics that is a target value when the OPE characteristics are matched among the plurality of exposure apparatus. So, the first evaluation criterion ESA2 corresponding to the parameters in the second set is a reference value $\Sigma SQ$ for a sum of squares of differences between the curved lines A1 and A2 at positions corresponding to the plurality of pitches, as one example. The predicted value of the exposure result obtained by the second calculating part 56B satisfies with the first evaluation criterion ESA2 if the sum of the squares of the differences between the curved lines A1 and A2 is smaller than or equal to the reference value $\Sigma SQ$.

Moreover, as one example, the predicted value of the exposure result obtained by the third calculating part 56C is the residual aberration after the variation amount of the image characteristics of the projection optical system PL due to the irradiated energy has been corrected by the image characteristics correcting apparatus 30. So the first evaluation criterion ESA3 includes the first order to the predetermined order of the coefficients (Zernike coefficients) Zci of the Zernike polynomial, as one example. And, the predicted value of the exposure result obtained by the third calculating part 56C satisfies with the first evaluation criterion ESA3 if the Zernike coefficient of the residual aberration is smaller than or equal to the corresponding coefficient Zci.

Moreover, the predicted value of the exposure result obtained by the fourth calculating part 56D is the overlay error of the exposed pattern image, and the predicted value of the exposure result satisfies with the first evaluation criterion ESA4 if the overlay error is smaller than or equal to the first evaluation criterion ESA4.

Moreover, the predicted value of the exposure result obtained by the fifth calculating part 56E is the above described residual error (an error with respect to a target shape) of the reticle pattern image, and the predicted value of the exposure result satisfies with the first evaluation criterion ESA5 if an absolute value of this error (for example, an error of the line width of the projected image) is smaller than or equal to the first evaluation criterion ESA5.

If at least one predicted value of the exposure result out of five predicted values of the exposure results does not satisfy with the first evaluation criterion ESAk, a step 112 is performed. And, if the kth predicted value of the exposure result does not satisfy with the first evaluation criterion ESAk, the sub control part 60 makes the kth calculating part (either one of 56A to 56E) optimize the values of the parameters in the kth set so that the predicted value of the exposure result satisfies with the corresponding first evaluation criterion ESAk. This step 112 is performed by all of the calculating part(s) (either one of 56A to 56E) in which the predicted value of the exposure result does not satisfy with the corresponding first evaluation criterion ESAk.

Then, the predicted value of the exposure result is calculated by the corresponding calculating part by using the optimized parameters in the kth set at the step 108, and then, it is evaluated whether or not the predicted value of the exposure result satisfies with the corresponding first evaluation criterion. Then, if each of the five predicted values of the exposure results satisfies with corresponding first evaluation criterion ESAk, the operation moves to a step 114 and the sub control part 60 makes the second store part 61 store the parameters in the five sets optimized by the five (K=5) calculating parts 56A to 56E. Note that the kth predicted value of the exposure result usually satisfies with the corresponding first evaluation criterion ESAk after the step 112 is performed, and thus the steps 108 and 110 may be omitted to perform a step 114.

Then, the parameter determining part 65 determines the values of the parameters included in the parameters in the five sets by calculating the weighted average of the common parameter in the parameters in the five sets by using the weighting (the priority order information) of each of five sets of the optimized parameters, and inputs (sets) the determined values of the parameters into the virtual exposure apparatus part 63 (a step 116).

As one example, it is assumed that the designed light intensity distribution of an illumination light source 44A for the reticle RA is a distribution in which the light intensity becomes higher at four areas 44Aa that are arranged to interpose an optical axis AXI of the illumination optical system ILS in the X direction and the Y direction, as illustrated in FIG. 5(A). It is assumed that the σ values of the illumination light source 44 at an outer side and an inner side are σ11 and σ21, respectively. Note that a circle 45 illustrated by a dashed line represents a border at which the σ value is 1.

On the other hand, it is assumed that the σ value of the illumination light source in the parameters in the second set that is optimized by the second calculating part 56B to match the OPE characteristics includes σ12 that is the value at the outer side and σ22 that is the value at the inner side, as illustrated by an illumination light source 44B in FIG. 5(B). Moreover, it is assumed that the σ value of the illumination light source in the parameters in the fifth set that is optimized by the fifth calculating part 56E to minimize the residual error of the reticle pattern image includes σ13 that is the value at the outer side and σ23 that is the value at the inner side, as illustrated by an illumination light source 44C in FIG. 5(C). Each of the illumination light sources 44B and 44c corresponds to the illumination light source obtained by adjusting an inner diameter and an outer diameter of the original illumination light source 44A in FIG. 5(A).

In this case, as one example, a weighting a2 is set to be larger than a weighting b2, wherein a2 and b2 are the weightings for the parameters in the second set and the fifth set, respectively (a2 and b2 is an actual number larger than or equal to zero). And, each of σ24 and σ25 that are the value at the outer side and the value of the inner side, respectively, of the σ value of the illumination light source that is set to the virtual exposure apparatus part 63 is represented as a weighted average described later. FIG. 5(C) illustrates an illumination light source 44D having this σ value.

$$\sigma24=(a2\times\sigma12+b2\times\sigma13)/(a2+b2) \quad (2A)$$

$$\sigma25=(a2\times\sigma22+b2\times\sigma23)/(a2+b2) \quad (2A)$$

In this case, the weightings for the parameters in the second set and the fifth set may be different for the σ value at the outer side and the e σ value at the inner side.

Moreover, it is assumed that the values of the exposure amount and the focus position in the parameters that are optimized by the first calculating part 56A on the basis of the CDU are Dz1 and bf1, respectively, and it is assumed that the values of the exposure amount and the focus position in the parameters that are optimized by the second calculating part 56B to match the OPE characteristics are Dz2 and bf2, respectively. In this case, the value Dz3 of the exposure amount that is set to the virtual exposure apparatus part 63 is represented by the above described formula (1). Moreover, regarding the focus position, the value of the focus position that is set to the virtual exposure apparatus part 63 is bf1 if the weighting for the parameters in the first set is 1 and the weighting for the parameters in the second set is zero. As a result, the process window PW2 that is obtained by the virtual exposure apparatus part 63 is set so that the exposure amount Dz3 and the focus position bf3 are at the center thereof, as one example, as illustrated in FIG. 6(C). In a same manner, the value of the common parameter among the plurality of sets is determined.

And, the virtual exposure apparatus part 63 calculates the light intensity distribution of the spatial image of the reticle RA generated by the projection optical system PL by simulation by using the pattern information of the ith reticle RA, the configuration information of the jth exposure apparatus EXA and the values of their parameters to obtain the predicted values of the exposure results (hereinafter, they are referred to as "first to fifth predicted values of the exposure results") corresponding to the five predicted values of the exposure results that are obtained by the above described calculating parts 56A to 56E (a step 118).

Then, the first to fifth predicted values of the exposure results are transmitted to the determining part 64, and the determining part 64 evaluates whether or not each of five predicted values of the exposure results is within a range of the above described evaluation criterion ESBk (k=1 to 5), namely, satisfies with the second evaluation criterion ESBk (a step 120). The operation at the step 120 is same as the operation at the step 110, except for the second evaluation criterion ESBk being used as the evaluation criterion.

If at least one predicted value of the exposure result out of five predicted values of the exposure results does not satisfy with the second evaluation criterion ESBk, a step 122 is performed. And, if the kth predicted value of the exposure result does not satisfy with the second evaluation criterion ESBk, the sub control part 60 makes the corresponding calculating part (at least one of 56A to 56E) recalculate the values of the parameters in the set including the parameter related to the kth predicted value of the exposure result, as one example. In this calculation, each calculating part optimizes the parameters in the corresponding set so that the corresponding predicted value of the exposure result satisfies with an evaluation criterion that is narrower than the second evaluation criterion ESBk, as one example. Note that each of all of the calculating parts 56A to 56E recalculate the parameters in the corresponding set.

At the step S122, when the parameters in the sets corresponding to the plurality of calculating parts are recalculated, the recalculation may be performed in order from the calculating part that calculates the parameters in the set having lower priority order. Moreover, only the parameters in the set having lower priority order may be recalculated and the parameters in the set having higher priority order may not be recalculated. Moreover, if the calculating part that calculates the parameter in a certain set needs the value of the parameter included in another set, for example, the value that has been calculated by another calculating part last time may be used as the value of this parameter.

Moreover, at the step 122, an example in which the second calculating part 56B recalculates the values of "the σ value of the illumination light source, the numerical aperture NA of the projection optical system PL, the exposure amount Dz, the focus position bf and the parameter defining the residual wave aberration of the projection optical system PL" that are the parameters in the second set will be described, for example. In this case, as one example, the value of the focus position bf in the parameters in the first set that has been calculated by the first calculating part having the higher priority order last time may be used as the value of the focus position bf in the parameters in the second set. In the same manner, when the value of the parameter in the corresponding set is recalculated by the calculating parts 56B to 56E, the value of the corresponding parameter in the parameters in the set that has been calculated by the calculating parts 56A to 56D having the higher priority order last time may be used. Therefore, a calculation amount in the calculating parts 56B to 56E can be reduced while the predicted value of the exposure result satisfies with the second evaluation criterion.

Then, the operation returns to the step 116, the values of all of the parameters included in the parameters in the five sets are determined by calculating the weighted average of the common parameter out of the parameters in the five sets including the parameter in the set recalculated at the step 122, and the determined values of all of the parameters are outputted (set) to the virtual exposure apparatus part 63. Then, the step 118 (the calculation of the predicted value of the exposure result in the virtual exposure apparatus part 63) and the step 120 (the evaluation of the predicted value of the exposure result) are performed, and if each of the five predicted values of the exposure results satisfies with the corresponding second evaluation criterion ESBk, the operation moves to a step 124 and the sub control part 60 makes the second store part 61 store the values of all of the parameters included in the calculated parameters in the five sets with them being associated with the ID information of the ith reticle and the jth exposure apparatus.

In the same manner, the operation from the steps 102 to 124 are performed with respect to another combination of the reticle and the exposure apparatus, and thus, the values of the parameters can be determined with respect to all of the combination of I reticles and j exposure apparatuses.

Then, when the exposure is performed by using the reticle RA in the exposure apparatus EXA in FIG. 1, the main control part 40 of the exposure apparatus EXA requires the values of the parameters corresponding the reticle RA and the exposure apparatus EXA of the main control part 50 of the master server 6 via the communication line 12. In response to this, the main control part 50 outputs the control information to the sub control part 60 to transmit the values of the parameters. Then, the sub control part 60 transmits the values of the parameters that have been read from the second store part 61 and that correspond to the reticle RA and the exposure apparatus EXA to the main control part 40 of the exposure apparatus EXA via the parameter output part 65, the IO port 8A, the communication line 12 and the communication unit 10A of the exposure apparatus EXA (a step 126).

The main control part 40 of the exposure apparatus EXA transmits the transmitted values of the parameters to the exposure control part 14, and the exposure control part 14 makes the store part 38 store the transmitted values of the parameters and set the value of the corresponding parameter to the image characteristics correcting apparatus 30 and the optical system 37. Then, the shot areas on a predetermined lot number of the wafer W are exposed in order by the image of the pattern of the reticle RA through the projection optical system PL on the basis of the set values of the parameters (a step 128). At this time, since the values of the parameters are optimized, the exposure can be performed with high accuracy. The exposed wafer is developed by the coater/developer (not illustrated), and thus the resist pattern is formed.

Then, when another reticle RB is used instead of the reticle RA to perform the exposure, the master server 6 transmits to the exposure apparatus EXA the parameters that have been optimized with respect to the combination of the reticle RB and the exposure apparatus EXA. The exposure of the image of the pattern of the reticle RB can be performed with high accuracy by performing the exposure using these parameters. In this exposure, the adjustment of the values of the parameters is not needed to be performed at the exposure apparatus EXA, and thus it is possible to keep the high throughput at the exposure process while keeping the high exposure accuracy even when the small lot production is performed repeatedly, for example.

Moreover, as one example, one portion of the exposed and developed wafers may be extracted, the extracted wafer may be transported to the inspection apparatus MEA in FIG. 1, the inspection apparatus MEA may measure the uniformity (CDU) of the line width of the most fine resist pattern on the wafer and the measurement result may be transmitted to the master server 6 via the communication line 12. Moreover, the exposure apparatus EXA may measure the shape of the illumination light source and/or the residua aberration of the projection optical system PL due to the irradiated energy by using the characteristics measurement apparatus 20, and may transmit the measurement result to the master server 6 via the communication line 12.

In this case, as one example, these measurement results may be inputted to the determining part 64 via the main control part 60 and the sub control part 60 in the master server 6, and the determining part 64 may evaluate whether or not the measurement result satisfies with the second evaluation criterion. And, if at least one portion of the measurement result does not satisfy with the second evaluation criterion, the parameters in the set corresponding to the exposure result that does not satisfy with the second evaluation criterion may recalculated as with the step 122, the values of all of the parameters determined at the step 116 on the basis of the obtained parameters may be transmitted to the exposure apparatus EXA as all of the parameters for the reticle RA and the exposure apparatus EXA, and the exposure apparatus EXA may perform the exposure by using the transmitted parameters. Therefore, the exposure can be performed with higher accuracy.

As described above, the lithography system DMS in the present embodiment is a lithography system configured to form the pattern on the waver W (a substrate) by the exposure and the development, and has the first calculating part 56A (a first simulation processing part) configured to obtain the values of "the exposure amount Dz (the best dose) and the focus position bf (the best focus position)" that are the parameters in the first set of the exposure apparatus EXA relating to the forming of the pattern (the step 108); and the second calculating part 56B (a second simulation processing part) configured to obtain the values of "the σ value of the illumination light source, the numerical aperture NA of the projection optical system, the exposure amount Dz, the focus position bf and the parameter defining the residual wave aberration of the projection optical system" that are the parameters in the second set of the exposure apparatus EXA relating to the forming of the pattern and that are at least partially same as the parameters in the first set (the step 108). Moreover, the lithography system DMS has the integration processing part 58 configured to evaluate, on the basis of the values of the parameters in the first set and the second set, a state of the pattern formed on the wafer W (for example, the OPE characteristics) and a forming condition when the pattern is formed (the exposure amount that is allowed to widen the CDU the most and the variable range of the focus position (the process window)) (the step 118), and to determine on the basis of the evaluation result whether or not to make at least one of the calculating parts 56A and 56B recalculate the value of the parameter in the corresponding set (the step 120).

Moreover, the master server 6 in the present embodiment is a simulation apparatus for the lithography system configured to form the pattern on the wafer W and has the integration processing part 58 configured to evaluate the state of the pattern formed on the wafer W and the forming condition when the pattern is formed on the basis of the values of the parameters in the first set that are calculated relating to the forming of the pattern and the values of the parameters in the second set that are at least partially same as the parameters in the first set, (the step 118), and to determine on the basis of the evaluation result whether or not to make corresponding calculating part 56A, 56B recalculate the value of at least one of the parameter in the first set and the parameter in the second set (the step 120).

According to the lithography system DMS, the master server 6, the pattern forming method using the lithography system DMS, or the pattern forming method using the master server 6, since the integration processing part 58 evaluates in advance the state of the pattern formed on the wafer W and the forming condition when the pattern is formed by using the parameters including the parameters in the first set and the second set, the values of all of the parameters included in the parameters in the first set and the second set can be optimized efficiently without performing the actual exposure by recalculating the parameter in the corresponding set, if the evaluation result (the exposure result) does not satisfy with the predetermine criterion (the evaluation criterion), for example.

Therefore, the parameters used at the exposure process (the lithography process) can be optimized (set) efficiently. And, the parameters is not needed to be adjusted in the exposure apparatus EXA every time the reticle is replaced, by using the optimized (set) parameters in the exposure apparatus EXA, and thus it is possible to keep the high throughput at the exposure process even when the small lot production is performed.

Moreover, in the present embodiment, the priority order is set as illustrated in the table 1. And, the parameters in the fifth set include the parameter (the σ value) defining the light intensity distribution (the illumination light source) on the pupil plane of the illumination system of the exposure apparatus, the parameters in the fourth set include the parameter (the residual distortion dis) relating to the image characteristics of the projection system of the exposure apparatus, and the integration processing part 58 makes the calculating part 56E having lower priority order recalculate the values of the parameters in the fifth set and then make s the calculating part 56D having higher priority order recalculate the values of the parameters in the fourth set if it is determined at the step 122 that each of the calculating parts 56E and D recalculate the values of the parameters in the corresponding set.

Moreover, the parameters in the fourth set include the parameter (the residual distortion dis) relating to the overlay error of the pattern formed on the substrate by the exposure apparatus, the parameters in the third set include the parameter (the saturation value Sab of the variation amount of the image characteristics due to the irradiated energy and the time constant τ) relating the temporal change of the characteristics of the aberration of the projection system of the exposure apparatus, and the integration processing part 58 makes the calculating part 56D having lower priority order recalculate the values of the parameters in the fourth set and then makes the calculating part 56C having higher priority order recalculate the values of the parameters in the third set if it is determined at the step 122 that each of the calculating parts 56D and 56C recalculate the values of the parameters in the corresponding set. Thus, the parameters in each set can be calculated efficiently.

Note that the present embodiment may be modified as described later.

Firstly, although the parameters for all exposure apparatuses EXA to EXE are calculated in the present embodiment, regarding the same type of exposure apparatuses, the parameters calculated for one of them may be set to the other same type of exposure apparatus.

Moreover, regarding the plurality of exposure apparatuses on the same line, the values of the parameters such as the parameter relating the overlay error may be determined so that the predicted values of the exposure results are substantially same as each other, for example.

Moreover, in the present embodiment, when the plurality of calculating parts 56A to 56E recalculate the parameters in the corresponding sets, the calculation is performed in order from the calculating part that calculates the parameters in the set having lower priority order (the calculating part having lower priority order), as one example. Instead of this, the calculation may be performed in order from the calculating part that calculates the parameters in the set having higher priority order (the calculating part having higher priority order).

Moreover, if the parameter calculated by the calculating part having the higher priority order is included in the parameter calculated by the calculating part having the lower priority order, the value (the calculated value) of the parameter calculated by the calculating part having the higher priority order may be directly used without change.

Moreover, if the parameter calculated by the calculating part having the lower priority order is included in the parameter calculated by the calculating part having the higher priority order, the value (the calculated value) of the parameter calculated by the calculating part having the lower priority order may be directly used without change.

Moreover, the above described embodiment makes the corresponding calculating part recalculate the parameter in the set at the step 112, with respect to the parameter in the set in which the predicted value of the exposure result is not within the first evaluation criterion at the step 110. On the other hand, each of the plurality of calculating parts may calculate the parameter in the corresponding set in an order based on the priority order from the beginning. As one example, an example in which the first calculating part obtains the values or the ranges of the parameters PA, PB and PC in the first set to keep the residual aberration of the projection optical system PL within an allowable range (the first evaluation criterion in this modified example) and the second calculating part obtains the values or the ranges of the parameters PA and PB in the second set to keep the difference (sum of the squares of the deltas or the like) between the OPE characteristics of the exposure apparatus EXA and a predetermined reference characteristics (the OPE characteristics of another exposure apparatus or the like) within an allowable range (the second evaluation criterion in this modified example) will be described with reference to FIG. 7. In this example, the priority order of the first calculating part is higher than that of the second calculating part, and the parameters PA and PB are common between the parameters in the first set and the parameters in the second set. The parameters (PA, PB and PC) in this example are a ninth order of the coefficient Za9 of the Zernike polynomial, the focus position and the coefficient Zaj (j=1 to 8, 10 to 49 or the like) of the Zernike polynomial that than the ninth order of the coefficient, respectively, for example.

In this modified example, as one example, the calculation of the corresponding parameters may be performed in order from the calculating part having higher priority order. Namely, at a step S132 in FIG. 7, the configuration data (data such as a pattern arrangement, a Fourier transformation pattern and a three-dimensional structure) of the ith reticle and a measurement data (a measurement result of the wave aberration and the like) of the exposure apparatus EXA are inputted, and the inputted data are ready to be used by the first and second calculating parts. Next, the operator inputs the allowable range of the residual aberration for the first calculating part (the first evaluation criterion) and the allowable range of the OPE characteristics for the second calculating part (the second evaluation criterion), for example (a step 134). Note that the evaluation criterions that have been set in advance may be used as the first and second evaluation criterions in the modified example.

And, the first calculating part obtains allowable ranges (they are regarded as pa1±α, pb1±β and pc1±γ) of the parameters PA, PB and PC in the first set on the basis of the first evaluation criterion (a step 136), and the second calculating part obtains the values (they are regarded as pa1+2×α and pb1+β/2) of the parameters PA and PB in the second set on the basis of the second evaluation criterion (a step 138). Then, at a step 140, it is determined whether or not the values of the parameters PA and PB in the second set are within the allowable ranges of the parameters PA and PB in the first set. If the values of the parameters PA and PB in the second set are within the allowable ranges of the parameters PA and PB in the first set, the operation moves to the step 118 in FIG. 4.

On the other hand, in this example, although the value (pb1+β/2) of the parameter PB in the second set is within the allowable range (pb1±β) of the corresponding parameter PB in the first set, the value (pa1+2×α) of the parameter PA in the second set is out of the allowable range (pa1±α) of the corresponding parameter PA in the first set, and thus, the operation moves to a step 142. And as one example, the first calculating part optimizes the parameters in the first set again by using the value (pa1+2×α) of the parameter PA of the parameters in the second set that is out of the allowable range. Namely, the first calculating part obtains the allowable range (they are regarded as pb2±β1 and pc2±γ1) of the other parameters PB and PC on the basis of the first evaluation criterion by using the value (pa1+2×α) obtained at the step 138 as the value of the parameter PA. And, at a step 144, it is determined whether or not the value (pb1+β/2) of the parameter PB in the second set obtained at the step 138 is within the allowable range (pb2±β1) of the parameters PB in the first set obtained at the step 142. If the value of the parameter PB in the second set is within the allowable range of the parameter PB in the first set, the operation moves to the step 118 in FIG. 4.

On the other hand, if the value of the parameter PB in the second set is out of the allowable range of the parameter PB in the first set, the operation moves to a step 146 in FIG. 7, and the second evaluation criterion (the allowable range of the OPE characteristics) for the parameter in the second set that are calculated by the second calculating part is corrected to be increased. Then, the operation moves to the step 138 and the second calculating part optimizes the parameters PA to PC in the second set on the basis of the corrected second evaluation criterion. Then, the operation at the steps 140, 142 and 144 is repeated. Note that an alarm may be notified to the operator or the value that is closest to the value of the parameter obtained by the second calculating part and that is within the range of the parameter obtained by the first calculating part may be used as the optimized value of the parameter, if the value of the parameter PB in the second set is out of the allowable range of the parameter PB in the first set at the step 140 even after the operation at the step 144 has been performed predetermined times (for example, two times), for example.

As described above, the lithography system DMS in this modified example is the lithography system for forming the pattern on the wafer W (the substrate) and has a first processing part (either one of the calculating parts 56A to 56E) configured to obtain the value of the parameter in the first set relating to the forming of the pattern, a second processing part (either one of the calculating parts 56A to 56E) configured to obtain the value of the parameter in the second set that includes common parameter being at least partially same as the parameter in the first set and that is relating to the forming of the pattern; and the integration processing part 58 configured to determine the value of the common parameter by using at least one of the value of the parameter in the first set and the value of the parameter in the second set.

According to this modified example, the parameter is optimized by the calculating part having the lower priority order to match the parameter optimized by the calculating part having the higher priority order, and thus the parameter can be optimized in accordance with the evaluation criterion that is to be emphasized. Note that only at least one of the steps 142 and 146 may be performed in this modified example.

Moreover, as the method of calculating the parameter in order from the calculating part having the higher priority order, a method of calculating the parameter for each group may be used as illustrated in FIG. 8. Note that the first to seventh evaluation criterions used in the modified example in FIG. 8 are different from the above described first and second evaluation criterions and the function of the first calculating part and the like is different from the function of the above described first calculating part.

In the example in FIG. 8, the first calculating part optimizes the parameters in the first set (for example, the σ value of the illumination system, an annular ratio in an annular illumination, the ninth order of the coefficient Za9 of the Zernike polynomial in the wavefront aberration, and MSD (Moving Standard Deviation) representing an accuracy of synchronization of a stage system) to make the width of the process window that is the allowable range of the exposure amount and the focus position of the exposure result be larger than an allowable range (the first evaluation criterion). Moreover, the second calculating part optimizes the parameters in the second set (the coefficient Zaj (j=1 to 49) of the Zernike polynomial, the focus position and the like) to keep the residual aberration within an allowable range (the second evaluation criterion) and the third calculating part optimizes the parameters in the third set (the coefficient Za9 of the Zernike polynomial, the focus position and the like) to keep the OPE characteristics within an allowable range (a third evaluation criterion).

Moreover, the fourth calculating part optimizes the parameters in the fourth set (the above described parameters Sab and τ for the lens control) to keep the variation amount of the image characteristics of the projection optical system PL due to the irradiated energy of the exposure light within an allowable range (a fourth evaluation criterion), and the fifth calculating part optimizes the parameters in the fifth set (the exposure amount, the focus position and the like) to keep the CDU (Critical Dimension Uniformity) within an allowable range (a fifth evaluation criterion). Moreover, the sixth calculating part optimizes the parameters in the sixth set (the distortion of the projection optical system, the MSD representing the accuracy of the synchronization of the stage system and the like) to keep the overlay error within an allowable range (a sixth evaluation criterion), and the seventh calculating part optimizes the parameters in the seventh set (the focus position and the like) to keep a positional difference between a wafer surface for the exposure target and the best focus position of the projection optical system within an allowable range (a seventh evaluation criterion). In this modified example, the first calculating part becomes the highest after the first calculating part making the width of the process window be larger than the allowable range is prioritized.

Moreover, in this modified example, the first to third calculating parts are categorized into a first group, the fourth to seventh calculating parts are categorized into a second group, the calculation order of the parameters may be changed in the first group and the calculation order of the parameters may be also changed in the second group. On the other hand, changing the calculation order of the parameters may be between the first group and the second group is not preferable.

In this modified example, firstly, the configuration data of the ith reticle and the measurement data of the exposure apparatus EXA are inputted at the step 132, and operator inputs the first to seventh evaluation criterions at a step 150. Note that the evaluation criterions that have been set in advance may be used as the first to seventh evaluation criterions in this modified example.

And, the first calculating part optimizes the parameters in the first set on the basis of the first evaluation criterion (a step 152), the second calculating part optimizes the parameters in the second set on the basis of the second evaluation criterion (a step 154), and the third calculating part optimizes the parameters in the third set on the basis of the third evaluation criterion (a step 156). Then, the fourth calculating part optimizes the parameters in the fourth set on the basis of the fourth evaluation criterion (a step 158), the fifth calculating part optimizes the parameters in the fifth set on the basis of the fifth evaluation criterion (a step 160), the sixth calculating part optimizes the parameters in the sixth set on the basis of the sixth evaluation criterion (a step 162), and the seventh calculating part optimizes the parameters in the seventh set on the basis of the seventh evaluation criterion (a step 164). Then, the operation moves into the step 118 in FIG. 4.

According to this modified example, the parameters in the corresponding set are optimized in order from the calculating part having higher priority, and thus the parameters can be optimized in accordance with the evaluation criterion having higher priority.

Note that the number of the first to seventh calculating parts may be any number and the plurality of calculating parts may be categorized into three or more groups in this modified example.

Moreover, in the above described embodiment and its modified example, if preferable result can be achieved by changing the parameters in the second set that have been optimized by the second calculating part when the fourth calculating part optimizes the parameters in the fourth set, for example, the second calculating part may be configured to optimize the parameters in the second set again to obtain the changed parameters in the second set.

As one example, firstly, the second calculating part optimizes the values of "the σ value (what we call the coherence factor) of the illumination light source, the numerical aperture NA of the projection optical system PL, the exposure amount Dz, the focus position bf and the parameter defining the residual wave aberration of the projection optical system PL" to match the OPE characteristics among the plurality of exposure apparatuses, for example. Then, the fourth calculating part optimizes the values of "the parameter pg defining the arrangement (the grid) of the plurality of shot areas on the wafer for the exposure target and the residual distortion dis of the projection optical system PL" to reduce the overlay error.

Here, if the parameters cannot be optimized by the fourth calculating part, the value of at least one (for example, the focus position) of the parameters in the second set having the values optimized by the second calculating part may be changed into or reset to another value (for example, the value of the focus position bf that is smaller than the value of the focus position bf used in the previous optimization), then the second calculating part may optimize the parameters in the second set again, and then the fourth calculating part may optimize the parameters in the fourth set again.

As described above, if the optimization by at least one calculating part (for example, the fourth calculating part) cannot be completed, the value that has been already optimized by another calculating part (for example, the second calculating part) may be changed and then the optimization by at least one calculating part (for example, the fourth calculating part) may be performed again.

Note that changing the already optimized value by at least one calculating part (for example, the second calculating part) is not limited to one value (for example, the focus position bf), and the plurality of values (for example, at least two or more of the σ value (what we call the coherence factor) of the illumination light source, the numerical aperture NA of the projection optical system PL, the exposure amount Dz, the focus position bf and the parameter defining the residual wave aberration of the projection optical system PL) may be changed.

Moreover, the calculation order (the priority) of each calculating part (for example, the first to fifth calculating parts) may be determined on the basis of a degree of the influence of the value that has been already optimized by at least one calculating part (for example, the second calculating part) (the number of other calculating parts that need the re-optimization due to the parameter optimized by at least one calculating part).

As one example, if there are a case where the second calculating part needs to optimize the parameters in the second set again after the first calculating part optimizes the parameters in the first set (a case where one calculating part is affected) and a case the third calculating part needs to optimize the parameters in the third set again and the fourth calculating part needs to optimize the parameters in the fourth set again after the second calculating part optimizes the parameters in the second set (a case where two calculating part are affected), the priority order of the optimization by the first calculating part may be set to be higher or lower than the optimization by the second calculating part.

Moreover, in the above described modified example of the embodiment, the evaluation criterion for optimizing the parameters in the first set in FIG. 8 is the width of the process window. Image log sloop (ILS) or normalized image log sloop (NILS) may be used as the evaluation criterion instead of the process window, as one example.

The ILS and NILS are known evaluation criterion that are used to obtain the performance of the imaging tool when any portion of the pattern is formed as an image. Moreover, sloop of log of the spatial image of the pattern is referred to as the ILS and this represents sloop of the light intensity at a position of an edge of the pattern. Moreover, the NILS is ILS that has been multiplied by the pattern size and normalized.

Moreover, in the present embodiment, the integration processing part 58 is included in the master server 6. As another structure, a simulation part that is same as the integration processing part 58 may be included in each of the parts of the exposure apparatuses EXA to EXE corresponding to the communication units 10A to 10E, and the simulation part may calculate the predicted value of the exposure result by using the parameters including the parameters in the first set to the fifth set that has been calculated by the calculating parts 56A to 56E. In this case, if the predicted value of the exposure result does not satisfy the evaluation criterion, the value of the parameter can be set efficiently by making the corresponding calculating parts 56A to 56E recalculate (optimize) the parameter.

Moreover, if the predicted value of the exposure result does not satisfy the evaluation criterion, the threshold value of the evaluation criterion may be changed and then the recalculation of the calculating parts 56A to 56E may be performed.

Moreover, in the above described embodiment, the values of the parameters for the exposure apparatus are determined by the master server 6, however, values of parameters for the coater/developer (not illustrated) may be determined by the master server 6 or the integration processing part 58. In this case, as one example, the parameters in the first set include "an average value of thickness of film, dispersion of the thickness of film and prebaking time" and the parameters in the second set include "the average value of thickness of film, the dispersion of the thickness of film and developing time". In this case, the master server 6 or the integration processing part 58 may obtain the parameters that are to be set from the coater/developer.

Moreover, in the embodiment, the values of the parameters for the exposure apparatus are determined by the master server 6, however, the values of the parameters for the coater/developer (not illustrated) may be determined by the master server 6 or the integration processing part 58. In this case, as one example, the parameters in the first set include "the average value of the thickness of film, the dispersion of the thickness of film and the prebaking time" and the parameters in the second set include "the average value of thickness of film, the dispersion of the thickness of film and the developing time". In this case, the master server 6 or the integration processing part 58 may obtain the parameters that are to be set from the coater/developer.

Moreover, when an electronic device (or a micro device) such as a semiconductor device is manufactured by using the lithography system DMS, the master server 6 or the pattern forming method using these in the above described each embodiment, the electronic device is manufactured through a step 221 at which function and performance of the electronic device is designed, a step 222 at which the mask (the reticle) based on the step for the design is manufactured, a step 223 at which the substrate (the wafer) that is the base material of the device is manufactured, a substrate processing step 224 including a process of exposing the substrate with the pattern of the mask by using the lithography system DMS or the like or the pattern forming method or the like in the above described embodiment, a process of developing the exposed substrate, a process of heating (curing) and etching the developed substrate and the like, a device assembling step 225 (including a fabrication process such as a dicing process, a bonding process, a packaging process and the like), an inspection step 226 and the like, as illustrated in FIG. 9.

In other words, the above described device manufacturing method includes: a step at which the substrate (the wafer) is exposed with the pattern of the mask by using the lithography system DMS or the like or the pattern forming method in the above described embodiment; and a step at which the exposed substrate is processed (namely, a developing step at which the resist on the substrate is developed and a mask layer corresponding to the pattern of the mask is formed on the surface of the substrate, and a processing step at which the surface of the substrate is processed (heated and etched) through the mask layer).

According to this device manufacturing method, the parameters is not needed to be adjusted in the exposure apparatus EXA and the like every time the reticle is replaced, and thus it is possible to manufacture the electronic device with the high throughput and high accuracy.

Note that the exposure apparatus of the lithography system in the above described embodiment may be a stepper type of exposure apparatus or the like. Moreover, the exposure apparatus may be an exposure apparatus (an EUV exposure apparatus) that is configured to use, as the exposure light, Extreme Ultraviolet Light (hereinafter, it is referred to as EUV light) having wavelength equal to or less than 100 nm.

Moreover, as the device manufacturing method in the present embodiment, the method of manufacturing the semiconductor device is described especially, however, the device manufacturing method in the present embodiment may be applied to the manufacturing of the device using material other than the semiconductor material such as a liquid crystal panel and a magnetic disk, instead of the device using the semiconductor material.

Note that the present invention is not limited to the above described embodiment, and various structures can be employed without departing from the essence of the present invention.

DESCRIPTION OF REFERENCE CODES

DMS lithography system
EXA to EXE exposure apparatus
RA reticle
PL projection optical system
W wafer
6 master server
10A to 10E communication unit
12 communication line
55 parameter calculating part
56A to 56E first to fifth calculating part
60 sub control part
62 parameter determining part
63 virtual exposure apparatus part
64 determining part

The invention claimed is:

1. A simulation apparatus for a lithography system configured to form a pattern on a substrate,
the simulation apparatus comprising:
a processing part configured to:
calculate a value of a parameter in a first set that is calculated relating to the forming of the pattern;
calculate a value of a parameter in a second set that is at least partially same as the parameter in the first set and that is calculated relating to the forming of the pattern;
evaluate, on the basis of the value of the parameter in the first set and the value of the parameter in the second set, at least one of a state of the pattern formed on the substrate and a forming condition when the pattern is formed; and
determine on the basis of the result of the evaluation whether or not to recalculate the value of at least one of the parameters in the first set and the second set; and
an outputting part configured to output, to the lithography system, a result of a calculation executed by the processing part.

2. The simulation apparatus according to claim 1, wherein the processing part is configured to:
determine a priority order of the parameters in advance, and
recalculate the value of at least one of the parameters in the first set and the second set on the basis of the priority order, if it is determined on the basis of the result of the evaluation that the value of at least one of the parameter in the first set and the second set is recalculated.

3. The simulation apparatus according to claim 1, wherein the processing part is configured to:
determine a priority order of a calculation of the value of the parameter in the first set and a calculation of the value of the parameter in the second set in advance, and
recalculate the value of at least one of the parameters in the first set and the second set on the basis of the priority order, if it is determined on the basis of the result of the evaluation that the value of at least one of the parameter in the first set and the second set is recalculated.

4. The simulation apparatus according to claim 1, wherein a parameter in an upper set having a high priority order and a parameter in a lower set having a priority order lower than the parameter in the upper set are included in the parameters in the first set and the second set, and the processing part is configured to recalculate the value of the parameter in the lower set on the basis of the updated value of the parameter in the upper set, if it is determined on the basis of the result of the evaluation that the value of the parameter in the lower set is recalculated.

5. The simulation apparatus according to claim 4, wherein the processing part is configured to recalculate the value of the parameter out of the parameters in the lower set other than the parameter in the upper set.

6. The simulation apparatus according to claim 1, wherein the outputting part is configured to output, to a lithography apparatus configured to form the pattern on the substrate, the value of the parameter including the parameter in a set to which the recalculation of the value is performed among the parameters in the first and second sets on the basis of the values of the parameters in the first set and the second set.

7. The simulation apparatus according to claim 6, wherein the processing part is configured to recalculate the value of the parameter in at least one set among the parameters in the first and second set, on the basis of a result of an inspection by an inspection apparatus configured to inspect a state of the pattern formed on the substrate by the lithography apparatus.

8. The simulation apparatus according to claim 1 comprising an input part configured to receive the parameter for the calculation from an exposure apparatus having an illumination system configured to perform a illumination of a mask pattern and a projection system configured to project an image of the mask pattern on the substrate.

9. The simulation apparatus according to claim 1, wherein the parameter in the first set includes a parameter specifying a light intensity distribution on a pupil plane of an illumination system of an exposure apparatus,
the parameter in the second set includes a parameter relating to image characteristics of a projection system of an exposure apparatus, and
the processing part is configured to recalculate the value of the parameter in the first set first and then recalculate the value of the parameter in the second set, if it is determined on the basis of the result of the evaluation that the values of the parameters in the first and second sets are recalculated.

10. The simulation apparatus according to claim 1, wherein
the parameter in the first set includes a parameter relating to an overlay error of the pattern formed on the substrate by an exposure apparatus,
the parameter in the second set includes a parameter relating to a temporal change of characteristics of aberration of a projection system of the exposure apparatus, and
the processing part is configured to recalculate the value of the parameter in the first set first and then recalculate the value of the parameter in the second set, if it is determined on the basis of the result of the evaluation that the values of the parameters in the first and second sets are recalculated.

11. The simulation apparatus according to claim 1 comprising an input part configured to receive the parameter for the calculation from a coater/developer configured to coat the substrate with a photosensitive film and to develop the photosensitive film.

12. A pattern forming method of forming a pattern on a substrate,
the pattern forming method including:
obtaining a value of a parameter in a first set relating to the forming of the pattern;
obtaining a value of a parameter in a second set relating to the forming of the pattern that is at least partially same as the parameter in the first set;
evaluating, on the basis of the value of the parameter in the first set and the value of the parameter in the second set, at least one of a state of the pattern formed on the substrate and a forming condition when the pattern is formed; and
determining on the basis of the result of the evaluation whether or not to recalculate the value of at least one of the parameters in the first set and the second set.

13. The pattern forming method according to claim 12 including:
determining a priority order of the parameters in advance; and
recalculating the value of at least one of the parameters in the first set and the second set on the basis of the priority order, if it is determined on the basis of the result of the evaluation that the value of at least one of the parameter in the first set and the second set is recalculated.

14. The pattern forming method according to claim 12 including:
determining a priority order of a calculation of the value of the parameter in the first set and a calculation of the value of the parameter in the second set in advance, and
recalculating the value of at least one of the parameters in the first set and the second set on the basis of the priority order, if it is determined on the basis of the result of the evaluation that the value of at least one of the parameter in the first set and the second set is recalculated.

15. The pattern forming method according to claim 12, wherein
a parameter in an upper set having a high priority order and a parameter in a lower set having a priority order lower than the parameter in the upper set are included in the parameters in the first set and the second set, and
the value of the parameter in the lower set is recalculated on the basis of the updated value of the parameter in the upper set, if it is determined on the basis of the result of the evaluation that the value of the parameter in the lower set is recalculated.

16. The pattern forming method according to claim 15, wherein
the value of parameter out of the parameters in the lower set other than the parameter in the upper set is recalculated.

17. The pattern forming method according to claim 12, wherein
the recalculated values of the parameters in the first set and the second set are set with respect to a lithography apparatus configured to form the pattern on the substrate on the basis of the values of the parameters in the first set and the second set.

18. The pattern forming method according to claim 17, wherein
the value of the parameter in at least one set among the parameters in the first and second set are recalculated on the basis of a result of an inspection by an inspection apparatus configured to inspect a state of the pattern formed on the substrate by the lithography apparatus.

19. The pattern forming method according to claim 12 including receiving the parameter for the calculation from an exposure apparatus having an illumination system configured to perform an illumination of a mask pattern and a projection system configured to project an image of the mask pattern on the substrate.

20. The pattern forming method according to claim 12, wherein
the parameter in the first set includes a parameter specifying a light intensity distribution on a pupil plane of an illumination system of an exposure apparatus,
the parameter in the second set includes a parameter relating to image characteristics of a projection system of an exposure apparatus, and
the pattern forming method includes recalculating the value of the parameter in the first set first and then recalculating the value of the parameter in the second set, if it is determined on the basis of the result of the evaluation that the value of the parameter is recalculated.

21. The pattern forming method according to claim 12, wherein
the parameter in the first set includes a parameter relating to an overlay error of the pattern formed on the substrate by an exposure apparatus,
the parameter in the second set includes a parameter relating to a temporal change of characteristics of aberration of a projection system of the exposure apparatus, and
the pattern forming method includes recalculating the value of the parameter in the first set first and then recalculating the value of the parameter in the second set, if it is determined on the basis of the result of the evaluation that the value of the parameter is recalculated.

22. The pattern forming method according to claim 12 including receiving the parameter for the calculation from a coater/developer configured to coat the substrate with a photosensitive film and to develop the photosensitive film.

23. A management apparatus for a lithography system configured to expose a substrate,
the management apparatus comprising:
a processing part configured to:
calculate a value of a parameter in a first set that is set to perform the exposure;
calculate a value of a parameter in a second set that is at least partially same as the parameter in the first set and that is set to perform the exposure;
evaluate, on the basis of the value of the parameter in the first set and the value of the parameter in the second set, at least one of a state of the pattern formed on the substrate and a forming condition when the pattern is formed; and
determine on the basis of the result of the evaluation whether or not to recalculate the value of at least one of the parameters in the first set and the second set; and
an outputting part configured to output, to the lithography system, a result of a calculation executed by the processing part.

24. The management apparatus according to claim 23, wherein
the processing part is configured to:
determine a priority order of the parameters in advance; and
recalculate the value of at least one of the parameters in the first set and the second set on the basis of the priority order, if it is determined on the basis of the result of the evaluation that the value of at least one of the parameter in the first set and the second set is recalculated.

25. The management apparatus according to claim 23, wherein
the processing part is configured to:
determine a priority order of a calculation of the value of the parameter in the first set and a calculation of the value of the parameter in the second set in advance; and
recalculate the value of at least one of the parameters in the first set and the second set on the basis of the priority order, if it is determined on the basis of the result of the evaluation that the value of at least one of the parameter in the first set and the second set is recalculated.

26. The management apparatus according to claim 23, wherein
a parameter in an upper set having a high priority order and a parameter in a lower set having a priority order lower than the parameter in the upper set are included in the parameters in the first set and the second set, and
the processing part is configured to recalculate the value of the parameter in the lower set on the basis of the updated value of the parameter in the upper set, if it is determined on the basis of the result of the evaluation that the value of the parameter in the lower set is recalculated.

27. The management apparatus according to claim 26, wherein
the processing part is configured to recalculate the value of the parameter out of the parameters in the lower set other than the parameter in the upper set.

28. The management apparatus according to claim 23, wherein
the processing part is configured to set, with respect to a lithography apparatus configured to form the pattern on the substrate, the value of the parameter including the parameter in a set to which the recalculation of the value is performed among the parameters in the first and second sets on the basis of the values of the parameters in the first set and the second set.

29. The management apparatus according to claim 28, wherein
the processing part is configured to recalculate the value of the parameter in at least one set among the parameters in the first and second set, on the basis of a result of an inspection by an inspection apparatus configured to inspect a state of the pattern formed on the substrate by the lithography apparatus.

30. The management apparatus according to claim 23 wherein,
the processing part is configured to receive the parameter for the calculation from an exposure apparatus having an illumination system configured to perform a illumination of a mask pattern and a projection system configured to project an image of the mask pattern on the substrate.

31. The management apparatus according to claim 23, wherein
the parameter in the first set includes a parameter specifying a light intensity distribution on a pupil plane of an illumination system of an exposure apparatus,
the parameter in the second set includes a parameter relating to image characteristics of a projection system of an exposure apparatus, and
the processing part is configured to recalculate the value of the parameter in the first set first and then recalculate the value of the parameter in the second set, if it is determined on the basis of the result of the evaluation that the values of the parameters in the first and second sets are recalculated.

32. The management apparatus according to claim 23, wherein
the parameter in the first set includes a parameter relating to an overlay error of the pattern formed on the substrate by an exposure apparatus,
the parameter in the second set includes a parameter relating to a temporal change of characteristics of aberration of a projection system of the exposure apparatus, and
the processing part is configured to recalculate the value of the parameter in the first set first and then recalculate the value of the parameter in the second set, if it is determined on the basis of the result of the evaluation that the values of the parameters in the first and second sets are recalculated.

33. The management apparatus according to claim 23, wherein
the processing part is configured to receive the parameter for the calculation from a coater/developer configured to coat the substrate with a photosensitive film and to develop the photosensitive film.

34. A non-transitory computer readable medium including a computer program executable by a computer configured to control a management system for a lithography system configured to form a pattern on a substrate, the computer program causing the computer to execute:
a processing for calculating a value of a parameter in a first set that is calculated relating to the forming of the pattern;
a processing for calculating a value of a parameter in a second set that is at least partially same as the parameter in the first set and that is calculated relating to the forming of the pattern; and
a processing for evaluating, on the basis of the value of the parameter in the first set and the value of the parameter in the second set, at least one of a state of the pattern formed on the substrate and a forming condition when the pattern is formed and determining on the basis of the result of the evaluation whether or not to recalculate the value of at least one of the parameters in the first set and the second set.

35. The non-transitory computer readable medium according to claim 34, wherein the computer program further causes the computer to execute:
a processing for determining a priority order of the parameters in advance; and
a processing for recalculating the value of at least one of the parameters in the first set and the second set on the basis of the priority order, if it is determined on the basis of the result of the evaluation that the value of at least one of the parameter in the first set and the second set is recalculated.

36. The non-transitory computer readable medium according to claim 34, wherein the computer program further causes the computer to execute:
a processing for determining a priority order of a calculation of the value of the parameter in the first set and a calculation of the value of the parameter in the second set in advance; and
a processing for recalculating the value of at least one of the parameters in the first set and the second set on the basis of the priority order, if it is determined on the basis of the result of the evaluation that the value of at least one of the parameter in the first set and the second set is recalculated.

37. The non-transitory computer readable medium according to claim 34, wherein
a parameter in an upper set having a high priority order and a parameter in a lower set having a priority order lower than the parameter in the upper set are included in the parameters in the first set and the second set, and
the computer program causes the computer to execute a processing for recalculating the value of the parameter in the lower set on the basis of the updated value of the parameter in the upper set, if it is determined on the basis of the result of the evaluation that the value of the parameter in the lower set is recalculated.

38. The non-transitory computer readable medium according to claim 37, wherein
the computer program causes the computer to execute a processing for recalculating the value of the parameter out of the parameters in the lower set other than the parameter in the upper set.

39. The non-transitory computer readable medium according to claim 34, wherein
the computer program causes the computer to execute a processing for setting, with respect to a lithography apparatus configured to form the pattern on the substrate, the value of the parameter including the parameter in a set to which the recalculation of the value is performed among the parameters in the first and second sets on the basis of the values of the parameters in the first set and the second set.

40. The non-transitory computer readable medium according to claim 39, wherein
the computer program causes the computer to execute a processing for recalculating the value of the parameter in at least one set among the parameters in the first and second set, on the basis of a result of an inspection by an inspection apparatus configured to inspect a state of the pattern formed on the substrate by the lithography apparatus.

41. The non-transitory computer readable medium according to claim 34, wherein
the computer program causes the computer to execute a processing for receiving the parameter for the calculation from an exposure apparatus having an illumination system configured to perform a illumination of a mask pattern and a projection system configured to project an image of the mask pattern on the substrate.

42. The non-transitory computer readable medium according to claim 34, wherein
the parameter in the first set includes a parameter specifying a light intensity distribution on a pupil plane of an illumination system of an exposure apparatus,
the parameter in the second set includes a parameter relating to image characteristics of a projection system of an exposure apparatus, and
the computer program causes the computer to execute a processing for recalculating the value of the parameter in the first set first and then recalculating the value of the parameter in the second set, if it is determined on the basis of the result of the evaluation that the values of the parameters in the first and second sets are recalculated.

43. The non-transitory computer readable medium according to claim 34, wherein
the parameter in the first set includes a parameter relating to an overlay error of the pattern formed on the substrate by an exposure apparatus,
the parameter in the second set includes a parameter relating to a temporal change of characteristics of aberration of a projection system of the exposure apparatus, and
the computer program causes the computer to execute a processing for recalculating the value of the parameter in the first set first and then recalculating the value of the parameter in the second set, if it is determined on the basis of the result of the evaluation that the values of the parameters in the first and second sets are recalculated.

44. The non-transitory computer readable medium according to claim 34, wherein
the computer program causes the computer to execute a processing for receiving the parameter for the calculation from a coater/developer configured to coat the substrate with a photosensitive film and to develop the photosensitive film.

45. A lithography system for forming a pattern on a substrate, the lithography system comprising:
a simulation apparatus comprising:
a first processing part configured to calculate a first calculated value of a parameter in a first set that is obtained relating to the forming of the pattern, and
a second processing part configured to calculate a second calculated value of a parameter in a second set that includes common parameter being at least partially same as the parameter in the first set and that is obtained relating to the forming of the pattern; and
an integration processing part configured to determine the value of the common parameter that is set to the lithography system by using at least one of the first calculated value and the second calculated value.

46. A device manufacturing method comprising: obtaining a value of a parameter in a first set relating to forming of a pattern at a first processing part;
obtaining a value of a parameter in a second set relating to forming of the pattern that includes common parameter being at least partially same as the parameter in the first set at a second processing part;
determining the value of the common parameter that is set to a lithography system by using at least one of the values of the parameter in the first set and the parameter in the second set;
forming a predetermined pattern on a substrate; and
processing a surface of the substrate via the predetermined pattern.

47. A management method for a lithography system configured to expose a substrate,
the management method comprising:
calculating a value of a parameter in a first set that is set to perform the exposure by a first processing part;
calculating a value of a parameter in a second set that is at least partially same as the parameter in the first set and that is set to perform the exposure by a second processing part; and
setting the value of the parameter that is common among the parameter in the first set and the parameter in the second set in accordance with a predetermined condition to an integration processing part.

48. A management method for a lithography system configured to expose a substrate,
the management method comprising:
calculating a value of a parameter in a first set that is set to perform the exposure by a processing part;
calculating a value of a parameter in a second set that is at least partially same as the parameter in the first set and that is set to perform the exposure by the processing part;
evaluating, on the basis of the value of the parameter in the first set and the value of the parameter in the second set by the processing part, at least one of a state of the pattern formed on the substrate and a forming condition when the pattern is formed; and
determining on the basis of the result of the evaluation whether or not to recalculate the value of at least one of the parameters in the first set and the second set by the processing part; and
outputting to the lithography system, a result of a calculation executed by the processing part.

* * * * *